US010310793B2

(12) United States Patent
Ishiguro

(10) Patent No.: US 10,310,793 B2
(45) Date of Patent: Jun. 4, 2019

(54) IMAGE PROCESSING SYSTEM HAVING PORTABLE TERMINAL THAT PREREGISTERS A JOB IN AN IMAGE PROCESSING APPARATUS, IMAGE PROCESSING APPARATUS, AND PORTABLE INFORMATION TERMINAL

(71) Applicant: KONICA MINOLTA, INC., Chiyoda-ku (JP)

(72) Inventor: Kazuhiro Ishiguro, Toyohashi (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 14/587,028

(22) Filed: Dec. 31, 2014

(65) Prior Publication Data
US 2015/0193674 A1 Jul. 9, 2015

(30) Foreign Application Priority Data
Jan. 6, 2014 (JP) .................. 2014-000146

(51) Int. Cl.
H04N 1/00 (2006.01)
G06F 3/12 (2006.01)

(52) U.S. Cl.
CPC .......... G06F 3/1292 (2013.01); G06F 3/1205 (2013.01); G06F 3/1253 (2013.01);
(Continued)

(58) Field of Classification Search
CPC .... G06F 3/1204; G06F 3/1226; G06F 3/1285; G06F 3/1288; G06F 3/1292; G06F 3/048;
(Continued)

(56) References Cited

U.S. PATENT DOCUMENTS 5,699,494 A * 12/1997 Colbert ................. G06F 3/1293
358/1.13
6,400,413 B1 * 6/2002 Miyake ................. G06T 3/4007
382/298
(Continued)

FOREIGN PATENT DOCUMENTS

JP 11-212406 A 8/1999
JP 2000-085219 A 3/2000
(Continued)

OTHER PUBLICATIONS

Notice of Reasons for Rejection dated Dec. 22, 2015 issued in the corresponding Japanese Patent Application No. 2014-000146 and English translation (18 pages).

Primary Examiner — Benny Q Tieu
Assistant Examiner — Juan M Guillermety
(74) Attorney, Agent, or Firm — Buchanan Ingersoll & Rooney PC

(57) ABSTRACT

An image processing system includes one or more image processing apparatuses connected to a network, and a portable information terminal having a function to preregister an image processing job to the image processing apparatus, wherein the portable information terminal includes a registration destination receiving unit configured to receive a selection of an image processing apparatus, a setting receiving unit configured to display a condition setting screen and receive setting input by a user, and a sending unit configured to send, to the image processing apparatus selected, first information on the execution condition of image processing and second information on a configuration of the condition setting screen, and each image processing apparatus includes a preregistration unit configured to preregister an image processing job, and a display control unit configured (Continued)

to generate a job setting display screen and display the job setting display screen on an operation panel.

26 Claims, 22 Drawing Sheets

(52) U.S. Cl.
CPC ..... *H04N 1/00344* (2013.01); *H04N 1/00413* (2013.01); *H04N 2201/0075* (2013.01); *H04N 2201/0094* (2013.01)

(58) Field of Classification Search
CPC ........ G06F 3/1203; G06F 3/1205; G06F 3/12; G06F 3/01; G06F 3/0489; G06F 3/1253; G06F 17/212; G06F 3/1208; G06F 3/128; H04N 1/00244; H04N 1/00413; H04N 1/00474; H04N 1/00482; H04N 1/00344; H04N 1/00; H04N 2201/0075; H04N 2201/0094; B41J 29/42; B41J 29/38; B41J 29/00; G03G 21/00; G05B 2219/40407; G05B 2219/35073; G05B 2219/23326; H05K 2201/09
USPC ........................................................ 358/1.15
See application file for complete search history.

(56) References Cited

U.S. PATENT DOCUMENTS

| | | | | |
|---|---|---|---|---|
| 2002/0171868 | A1* | 11/2002 | Yoshimura et al. ......... | 358/1.15 |
| 2003/0053105 | A1* | 3/2003 | Morooka ............... | G06F 3/1204 358/1.13 |
| 2006/0007475 | A1* | 1/2006 | Sato ....................... | G06F 3/1207 358/1.15 |
| 2006/0107204 | A1* | 5/2006 | Epstein ................. | G06F 17/217 715/243 |
| 2006/0274370 | A1* | 12/2006 | Shima ........................... | 358/1.15 |
| 2009/0201546 | A1* | 8/2009 | Ohashi ............... | H04N 1/00244 358/1.15 |
| 2009/0207438 | A1* | 8/2009 | Fujita ........................... | 358/1.15 |
| 2010/0177345 | A1* | 7/2010 | Watanabe .................... | 358/1.15 |
| 2010/0315680 | A1* | 12/2010 | Ishikake ....................... | 358/1.15 |
| 2011/0063645 | A1* | 3/2011 | Sugino ................... | G06F 3/1292 358/1.13 |
| 2011/0320952 | A1* | 12/2011 | Kataoka ............. | H04N 1/00204 715/735 |
| 2012/0182432 | A1* | 7/2012 | Okamoto .............. | G06F 3/1204 358/1.15 |
| 2012/0206388 | A1* | 8/2012 | Tsuboi ............... | H04N 1/00307 345/173 |
| 2012/0287452 | A1* | 11/2012 | Tsujimoto .......... | H04N 1/00244 358/1.13 |
| 2012/0320419 | A1* | 12/2012 | Ito .......................... | G06F 3/1204 358/1.15 |
| 2013/0014285 | A1* | 1/2013 | Sasakura ................ | G06Q 50/01 726/29 |
| 2013/0027746 | A1* | 1/2013 | Sasase ......................... | 358/1.15 |
| 2013/0088449 | A1* | 4/2013 | Kurumasa ........... | G06F 3/04883 345/173 |
| 2013/0114107 | A1* | 5/2013 | Park ....................... | G06F 3/1204 358/1.15 |
| 2014/0019869 | A1* | 1/2014 | Miyata .............. | G06F 17/30905 715/738 |
| 2014/0153022 | A1* | 6/2014 | Yamamizu ......... | G06K 15/4055 358/1.13 |
| 2014/0285845 | A1* | 9/2014 | Ishikawa ............ | H04N 1/00482 358/1.15 |
| 2015/0172329 | A1* | 6/2015 | Wong .................... | G06F 3/0485 715/753 |

FOREIGN PATENT DOCUMENTS

| | | |
|---|---|---|
| JP | 2000-278774 A | 10/2000 |
| JP | 2002-171378 A | 6/2002 |
| JP | 2003-067293 A | 3/2003 |
| JP | 2003-131842 A | 5/2003 |
| JP | 2005-045479 A | 2/2005 |
| JP | 2005-086266 A | 3/2005 |
| JP | 2006-014082 A | 1/2006 |
| JP | 2006-344082 A | 12/2006 |
| JP | 2007-074162 A | 3/2007 |
| JP | 2009-021742 A | 1/2009 |
| JP | 2009-188940 A | 8/2009 |
| JP | 2011-186405 A | 9/2011 |

* cited by examiner

FIG. 9A

| SCREEN RESOLUTION |
|---|
| 960 × 540 |

FIG. 9B

| LAYOUT NUMBER | LAYOUT INFORMATION |
|---|---|
| 004 | INFORMATION ON SIZE AND ARRANGEMENT POSITION OF EACH DISPLAY REGION, AND SIZE AND ARRANGEMENT INTERVAL OF ICONS |

| REGISTRATION NUMBER | EXECUTION CONDITION ||||| SCREEN CONFIGURATION INFORMATION |
| --- | --- | --- | --- | --- | --- | --- |
| | DOCUMENT MODE | PAPER SIZE | UNDERPRINTING | MAGNIFICATION | ...... | SCREEN LAYOUT NUMBER α |
| KM2-001 | "WORD/PHOTO" | A4 LANDSCAPE | ON | 100% | | 006 |
| KM3-001 | "PHOTO" | A5 LANDSCAPE | ON | 70% | | 002 |
| KM1-001 | "WORD" | A4 PORTRAIT | OFF | 100% | | 004 |
| . | | | | | | |
| . | | | | | | |
| . | | | | | | | t11

FIG. 11B

| LAYOUT NUMBER | SCREEN RESOLUTION | LAYOUT INFORMATION |
| --- | --- | --- |
| | | INFORMATION ON SIZE AND ARRANGEMENT POSITION OF EACH DISPLAY REGION, AND SIZE AND ARRANGEMENT INTERVAL OF ICONS |
| 001 | 320 × 240 | . |
| 002 | 480 × 320 | . |
| 003 | 800 × 480 | . |
| 004 | 960 × 540 | . |
| 005 | 1024 × 600 | . |
| 006 | 1280 × 720 | . |
| 007 | 1280 × 800 | |

| EXECUTION CONDITIONS | | MFP11 | MFP13 | COMMON FUNCTIONS | COMMON ITEMS |
|---|---|---|---|---|---|
| DOCUMENT MODE | WORD | ○ | ○ | ○ | |
| | WORD/PHOTO | ○ | ○ | ○ | ○ |
| | PHOTO | ○ | ○ | ○ | |
| PAPER SIZE | A5 PORTRAIT | ○ | ○ | ○ | |
| | A4 PORTRAIT | ○ | ○ | ○ | ○ |
| | A3 PORTRAIT | ○ | × | × | |
| | A5 LANDSCAPE | ○ | ○ | ○ | |
| | ‥ | ‥ | ‥ | ‥ | |
| COLOR | BLACK AND WHITE | ○ | ○ | ○ | ○ |
| | COLOR | ○ | ○ | ○ | ○ |
| MAGNIFICATION | 50~200% | ○ | ○ | ○ | ○ |
| ONE SIZE/BOTH SIZE PRINTING | ONE SIDE | ○ | ○ | ○ | ○ |
| | BOTH SIDES | ○ | ○ | ○ | ○ |
| COLLECTIVE PRINTING | 2in1 | ○ | ○ | ○ | |
| | 4in1 | ○ | ○ | ○ | |
| FINISHING | STAPLER | ○ | × | × | × |
| UNDERPRINTING | UNDERPRINTING | ○ | × | × | × |
| ‥ | ‥ | | | | |
| ‥ | ‥ | | | | | t31, t32, C1, C2, L1, L2

FIG. 17B

| EXECUTION CONDITIONS | | MFP11 | MFP12 | MFP13 | MFP14 | COMMON FUNCTIONS | COMMON ITEMS |
|---|---|---|---|---|---|---|---|
| DOCUMENT MODE | WORD | ○ | ○ | ○ | ○ | ○ | |
| | WORD/PHOTO | ○ | × | ○ | ○ | × | × |
| | PHOTO | ○ | × | ○ | ○ | × | |
| PAPER SIZE | A5 PORTRAIT | ○ | ○ | ○ | ○ | ○ | |
| | A4 PORTRAIT | ○ | ○ | ○ | × | ○ | |
| | A3 PORTRAIT | ○ | ○ | ○ | ○ | × | ○ |
| | A5 LANDSCAPE | ○ | ○ | ○ | ○ | ○ | |
| | ·· | ·· | ·· | ·· | ·· | ·· | |
| COLOR | BLACK AND WHITE | ○ | ○ | ○ | ○ | ○ | × |
| | COLOR | ○ | × | ○ | × | × | |
| MAGNIFICATION | 50~200% | ○ | ○ | ○ | ○ | ○ | ○ |
| ONE SIZE/BOTH SIZE PRINTING | ONE SIDE | ○ | ○ | ○ | ○ | ○ | × |
| | BOTH SIDES | ○ | ○ | ○ | × | × | |
| COLLECTIVE PRINTING | 2in1 | ○ | ○ | ○ | × | × | × |
| | 4in1 | ○ | × | × | × | × | |
| FINISHING | STAPLER | ○ | ○ | × | × | × | × |
| UNDERPRINTING | UNDERPRINTING | ○ | ○ | × | × | × | × |
| ·· | | | | | | | |
| ·· | | | | | | | |

FIG. 21A
FIG. 21B
FIG. 21C
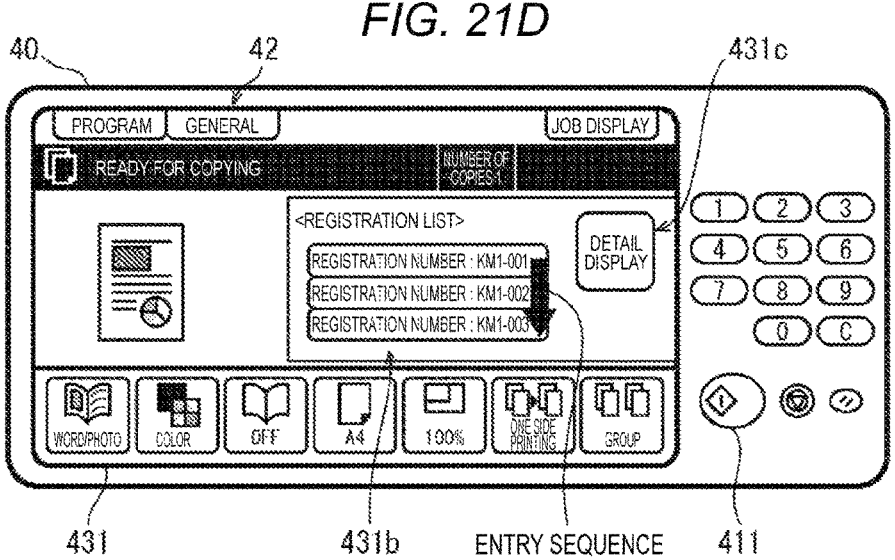
FIG. 21D
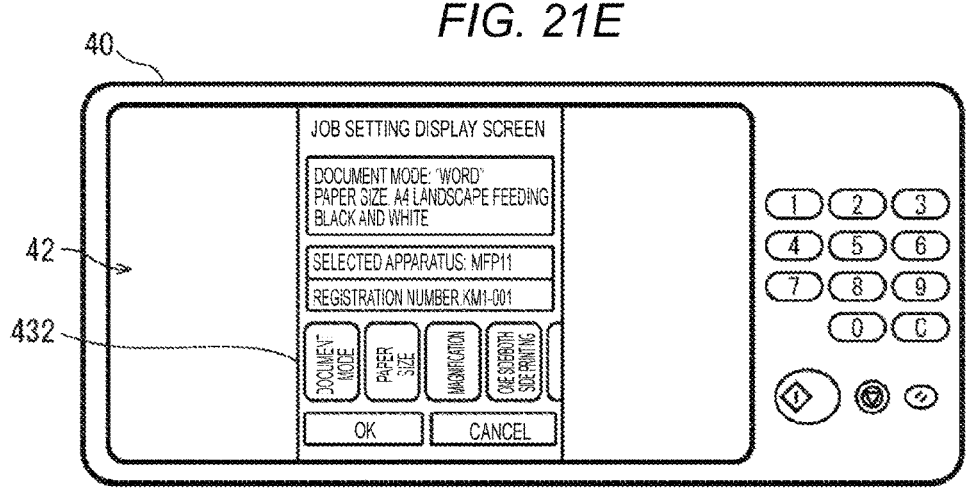
FIG. 21E

IMAGE PROCESSING SYSTEM HAVING PORTABLE TERMINAL THAT PREREGISTERS A JOB IN AN IMAGE PROCESSING APPARATUS, IMAGE PROCESSING APPARATUS, AND PORTABLE INFORMATION TERMINAL

The entire disclosure of Japanese Patent Application No. 2014-000146 filed on Jan. 6, 2014 including description, claims, drawings, and abstract are incorporated herein by reference in its entirety.

BACKGROUND OF THE INVENTION

Field of the Invention

The present invention relates to an image processing system capable of preregistration of a job such as a copy and a scan to an image processing apparatus from a portable information terminal such as a smartphone, and specifically relates to improvement of operability of an operation panel of an image processing apparatus that displays an execution condition of a preregistered job.

Description of the Related Art

An image processing apparatus such as a copy machine usually includes an operation panel for setting execution conditions (for example, a document size, color/black and white, and magnification) for executing a job such as a copy and a scan. In such an image processing apparatus, while one user operates the operation panel, another user cannot use it, and therefore a waiting time for the other user gets longer as the operation is prolonged.

Therefore, an image processing system which can set, in advance, an execution condition of a job such as a copy and a scan by using an external terminal device being communicatively connected to an image processing apparatus instead of an operation panel, has been proposed to shorten the waiting time (for example, JP 2009-188940 A). Such an image processing system is configured so that a user can set, in advance, an execution condition of a job from an external terminal device, and preregister a job on the set execution condition to an image processing apparatus, and also the preregistered job can be executed from an operation panel of the image processing apparatus. As a result, a user operation on the operation panel can be reduced, and a waiting time caused by operation can be shortened.

Also, it is very convenient that a user can preregister a job anywhere if the user uses, as an external terminal device of the above image processing system, a multifunction mobile phone such as a smartphone, and a small portable information terminal such as a personal digital assistant (PDA) and a tablet terminal, which have been recently widely used.

In the case of a small portable information terminal, the size of an operated liquid crystal panel is small, and therefore, in general, a screen layout is individually designed depending on the size. For this reason, in the above conventional image processing system, a screen layout for setting a job execution condition is different between an operation panel of a portable information terminal and an operation panel of an image processing apparatus. As a result, in the case where a user confirms a set content of a preregistered job by displaying it on an operation panel, there is a problem that the user is confused by the difference in the screen layout, and operability is degraded.

SUMMARY OF THE INVENTION

An object of the present invention is, in view of the above problem, to provide an image processing system, an image processing apparatus, and a portable information terminal, which can improve operability more than conventional operability in the case where a user confirms, by displaying on an operation panel, a set content of a job being preregistered to the image processing apparatus from the portable information terminal.

To achieve the abovementioned object, according to an aspect, an image processing system reflecting one aspect of the present invention comprises one or more image processing apparatuses connected to a network; and a portable information terminal having a function to preregister an image processing job to the image processing apparatus. In the image processing system, the portable information terminal comprises a registration destination receiving unit configured to receive, from a user, a selection of an image processing apparatus to preregister a job; a setting receiving unit configured to display a condition setting screen for setting an execution condition of image processing and receive setting input by a user; and a sending unit configured to send, to the image processing apparatus having been selected in the registration destination receiving unit, first information on the execution condition of image processing, which has been received from the condition setting screen, and second information on a configuration of the condition setting screen, and each of the one or more image processing apparatuses comprises a preregistration unit configured to preregister an image processing job upon receiving the first information sent from the portable information terminal; and a display control unit configured to generate a job setting display screen showing a set content of an execution condition of the preregistered image processing job based on the second information and display the job setting display screen on an operation panel which receives operation input from a user.

To achieve the abovementioned object, according to an aspect, an image processing apparatus reflecting one aspect of the present invention comprises a function to preregister an image processing job upon receiving information on an execution condition received through a condition setting screen for setting an execution condition of image processing in a portable information terminal; a receiving unit configured to receive screen configuration information on a configuration of the condition setting screen sent from the portable information terminal; and a display control unit configured to generate a job setting display screen showing a set content of an execution condition of a preregistered image processing job based on the screen configuration information and display the job setting display screen on an operation panel which receives operation input from a user.

To achieve the abovementioned object, according to an aspect, an portable information terminal reflecting one aspect of the present invention is communicatively connected, via a network, to one or more image processing apparatuses which preregister an image processing job based on information on an execution condition of image processing sent via the network, generate a job setting display screen showing a setting content of an execution condition of the preregistered image processing job based on screen configuration information sent via the network, and display the job setting display screen on an operation panel. The portable information terminal comprises a registration destination receiving unit configured to receive, from a user, a selection of an image processing apparatus to preregister a job; a setting receiving unit configured to display a condition setting screen for setting an execution condition of image processing and receive setting input by a user; and a sending unit configured to send, to the image processing apparatus selected by the user, information on an execution condition of image processing received on the condition setting screen and screen configuration information on a configuration of the condition setting screen.

To achieve the abovementioned object, according to an aspect, a non-transitory recording medium storing a computer readable program reflecting one aspect of the present invention is executed in a computer of a portable information terminal, which is communicatively connected, via a network, to one or more image processing apparatuses which preregister an image processing job based on information on an execution condition of image processing sent via the network, generate a job setting display screen showing a setting content of an execution condition of the preregistered image processing job based on screen configuration information sent via the network, and display the job setting display screen on an operation panel. The program causes the computer to execute (a) a step of receiving, from a user, a selection of an image processing apparatus to preregister a job; (b) a step of displaying a condition setting screen for setting an execution condition of image processing on an input panel and receiving setting input by a user; and (c) a step of sending, to the image processing apparatus selected by the user, first information on an execution condition of image processing received on the condition setting screen and second information on a configuration of the condition setting screen.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIGS. 9A and 9B are tables illustrating an example of screen configuration information of a screen resolution and an execution condition setting screen, which are stored in a hard disk of the portable terminal;

FIGS. 11A and 11B are tables illustrating an example of a registered job management table and a screen configuration management table, which are stored in a hard disk of the MFP;

FIGS. 17A and 17B are tables illustrating examples of an execution condition determination table;

FIGS. 21A to 21E are views for describing examples of an execution condition display sequence of a registered job setting display screen on an operation panel of an MFP according to the variation.

DESCRIPTION OF THE PREFERRED EMBODIMENTS

Hereinafter, an embodiment of the present invention will be described with reference to the drawings. However, the scope of the invention is not limited to the illustrated examples.

Figure 1:
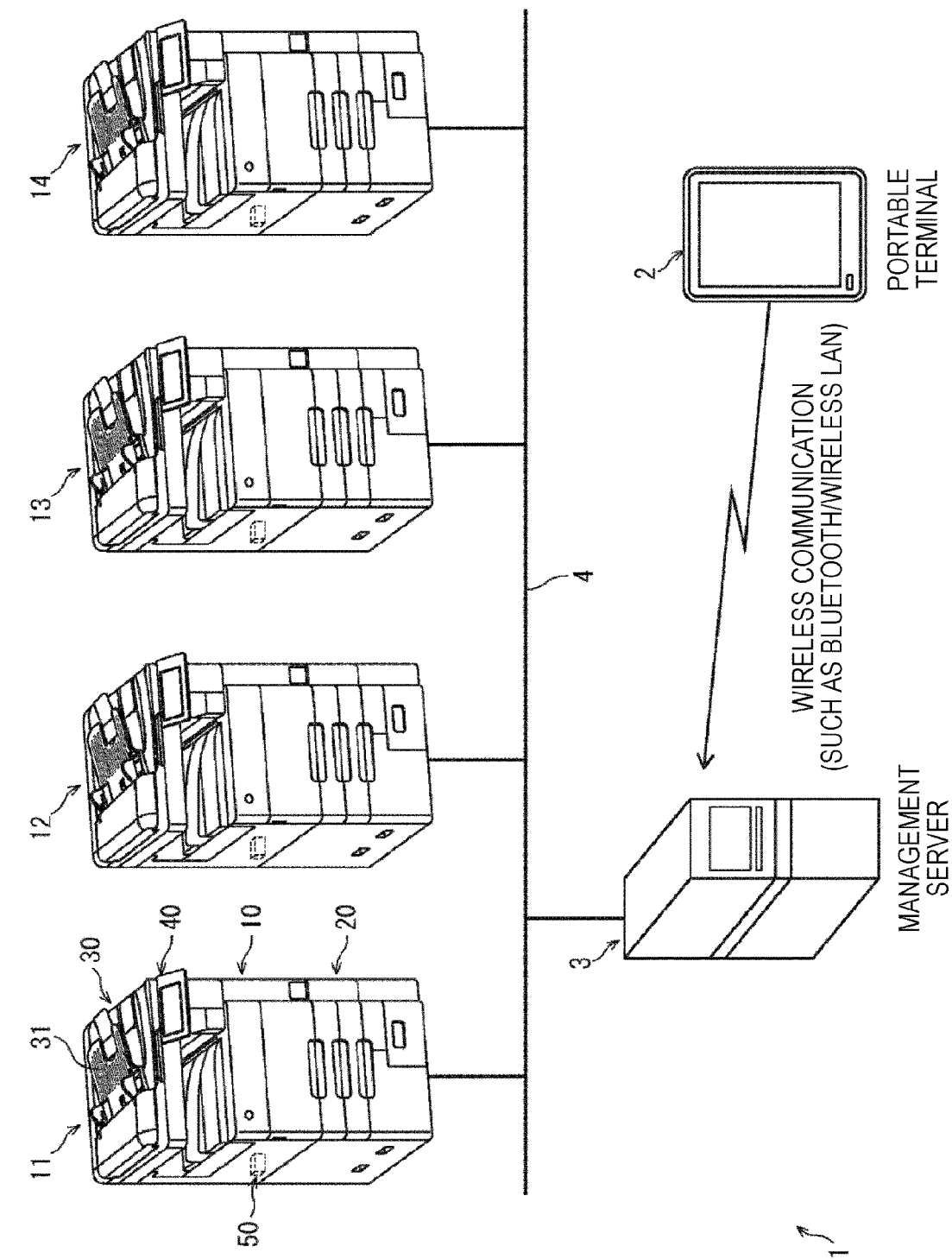
FIG. 1 is a schematic view illustrating a configuration of an image processing system according to a first embodiment of the present invention.

(1) Overall configuration: Hereinafter, an image processing system according to the first embodiment of the present invention will be described with reference to the drawings. FIG. 1 is a schematic view illustrating a configuration of the image processing system according to the present embodiment. As illustrated in the figure, the image processing system 1 includes MFPs 11 to 14 as an image processing apparatus, a management server 3, a network (LAN 4) connecting the MFPs 11 to 14 and the management server 3, and a portable terminal 2.

The MFP 11 includes, as main components, a printer 10, a paper feeding unit 20, a scanner 30, an operation panel 40, and a control unit 50. The MFP 11 has a function to perform printing upon receiving an execution instruction of a printing job from an external terminal (not illustrated in the figure) such as a computer connected to the MFP 11 via the LAN 4. Also, the MFP 11 has a function to execute a job such as a copy, a scan, and a facsimile. The scanner 30 feeds and carries each of documents being set on a document mounting platform 31, reads an original image of the documents, and generates image data (scan).

The printer 10 prints on recording sheets, which are carried from the paper feeding unit 20, based on image data having been read in the scanner 30 and image data being sent with a printing job from an external terminal (copy and print). The paper feeding unit 20 timely carries a recording sheet being stored in a paper feeding cassette to the printer 10 by feeding each sheet.

The operation panel 40 is arranged at a position, where it is easy for a user to operate, on top of the printer 10. The operation panel 40 receives an execution condition setting and an execution instruction when a job such as a copy, a scan, and a facsimile is executed by a user, and displays a waiting state of a received job and an execution result. The control unit 50 generally controls the printer 10, the paper feeding unit 20, the scanner 30, and the operation panel 40.

Basic configurations of the MFPs 12 to 14 are almost common to that of the MFP 11. Herein, the MFPs 11 and 13 are a multifunction printer corresponding to a color image, and the MFPs 12 and 14 are a multifunction printer dedicated for black and white image. The management server 3 monitors connection between the MFPs 11 to 14 and the LAN 4, and also functions as an access point of wireless communication (for example, Bluetooth (registered trademark)).

The portable terminal 2 is, for example, a small-sized tablet type personal computer, and connects wirelessly to the management server 3 and can send data to each of the MFPs 11 to 14 through the management server 3. A user can print by sending a printing job from the portable terminal 2 to the MFPs 11 to 14, and use the portable terminal 2 as a terminal for setting a job execution condition instead of the operation panel 40 when performing a copy, a scan, and a facsimile with the MFPs 11 to 14.

Each of the MFPs 11 to 14 receives and registers a job execution condition set with the portable terminal 2 by a user. Hereinafter, this registration is called "preregistration" of a job, and a preregistered job is called "a registered job". Then, each of the MFPs 11 to 14 waits for an execution instruction from the operation panel 40 by a user and executes a registered job. A detail will be described below.

Figure 2:
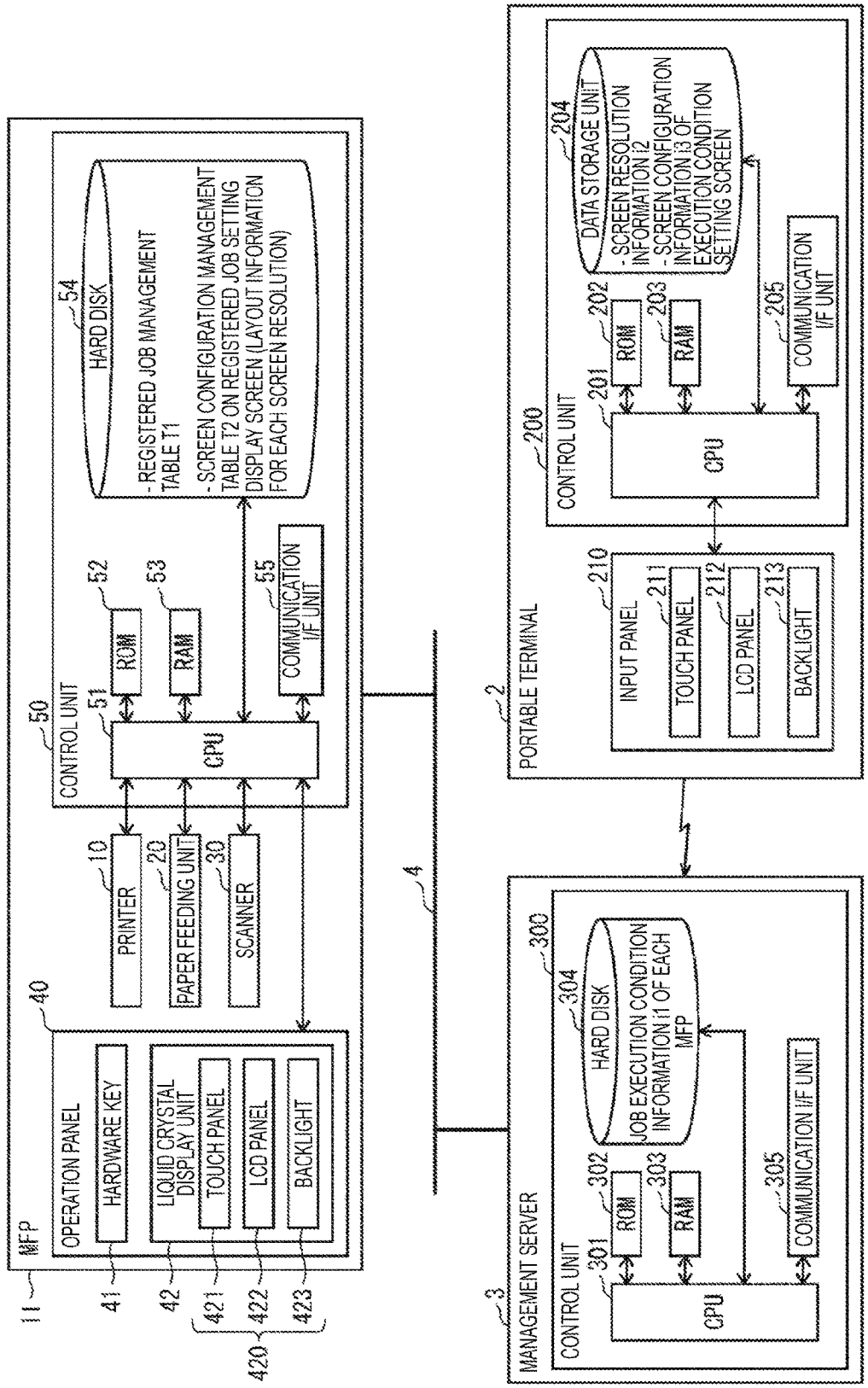
FIG. 2 is a block diagram illustrating each control configuration of a multifunction printer (MFP), a management server, and a portable terminal, which are included in the image processing system.

(2) Control configuration of an MFP, a management server, and a portable terminal: FIG. 2 is a block diagram illustrating each control configuration of the MFP 11, the management server 3, and the portable terminal 2.

First, the control unit 50 of the MFP 11 includes a central processing unit (CPU) 51, a read only memory (ROM) 52, a random access memory (RAM) 53, a hard disk 54, and a communication I/F unit 55. The MFPs 12 to 14 have a similar configuration. The CPU 51 executes a program for controlling the printer 10, the paper feeding unit 20, the scanner 30, and the operation panel 40. The ROM 52 is a storage for storing specifications of each program, which is executed by the CPU 51, and MFPs (for example, a screen resolution of an operation panel and applicable execution conditions of an image processing job). The RAM 53 is a work area used when the CPU 51 executes a program.

The hard disk 54 stores, for example, a registered job management table T1, which stores an execution condition of a registered job, and a screen configuration management table T2 of a screen, which displays a set content (an execution condition) of a registered job. The communication I/F unit 55 is an interface for connecting to a LAN, and includes a LAN card or a LAN board.

The operation panel 40 includes a hardware key 41 and a liquid crystal display unit 42. The hardware key 41 includes a start button 411, a reset button 412 and multiple ten keys (see FIG. 4). The liquid crystal display unit 42 includes a panel unit 420, in which a backlight 423, a liquid crystal display (LCD) panel 422 and a touch panel 421 are laminated.

A control unit 300 of the management server 3 includes a CPU 301, a ROM 302, a RAM 303, a hard disk 304, and a communication I/F unit 305. The control unit 300 manages a network, and has a function to relay data transmission and reception among the MFPs 11 to 14 and between each of the MFPs 11 to 14 and the portable terminal 2. The CPU 301 executes, for example, a ping command for monitoring connection between the MFPs 11 to 14 and the LAN 4, and a file transfer protocol for data transfer between the portable terminal 2 and the MFPs 11 to 14.

The ROM 302 is a storage for storing a command, a protocol, and each program, which are executed by the CPU 301. The RAM 303 is a work area used when the CPU 301 executes a program. The hard disk 304 stores, for example, settable job execution condition information i1, which has been acquired from each of the MFPs 11 to 14 in advance. The communication I/F unit 305 includes a wired interface such as a LAN card and a LAN board, which is connected to the LAN 4 in a wired manner, and a wireless interface including an incorporated antenna, which is wirelessly connected to the portable terminal 2 (herein, a Bluetooth interface is used.).

A control unit 200 in the portable terminal 2 includes a CPU 201, a ROM 202, a RAM 203, a data storage unit 204, and a communication I/F unit 205. The CPU 201 generates a screen for setting an runtime requirement of an image processing job, which is executed by each of the MFPs 11 to 14, and executes a program for displaying the screen on an input panel 210 and a program for controlling the input panel 210 (of a touch panel type).

The ROM 202 is a storage for storing each program to be executed by the CPU 201. The RAM 203 is a work area used when the CPU 201 executes a program. The data storage unit 204 is a nonvolatile storage medium (for example, a solid state drive (SSD)), and stores screen resolution information i2 of the input panel 210, and screen configuration information i3 of a screen for setting an execution condition of a job, such as a copy, a scan, and a facsimile.

The communication I/F unit 205 is an interface for communicating wirelessly with the control unit 300 of the management server 3, and incorporates an antenna for internally sending and receiving a radio wave. The input panel 210 includes a panel unit, in which a backlight 213, an LCD panel 212, and a touch panel 211 are laminated.

(3) An outline of job preregistration: FIGS. 3A to 3E are views for describing an outline of an operation to preregister a job from a portable terminal, according to the present embodiment.

Figure 3A:
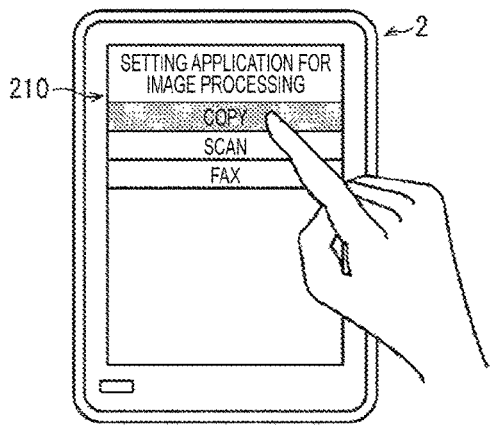
FIGS. 3A to 3E are views for describing an outline of an operation to preregister a job from the portable terminal.
Figure 3B:
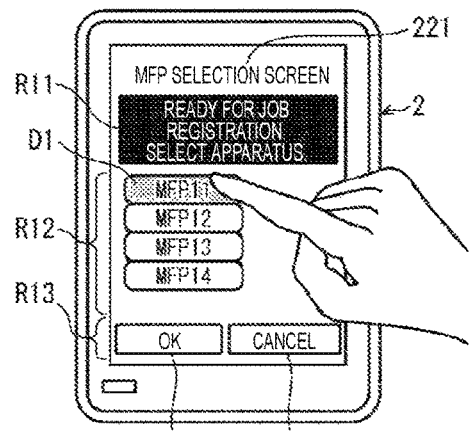

First, a user selects, by tapping with a finger, image processing (such as a copy, a scan, and a facsimile), for example, on a preregistration menu screen 220 illustrated in FIG. 3A, which is displayed on the input panel 210 of the portable terminal 2 (herein, a copy is selected). Then, as illustrated in FIG. 3B, an MFP selection screen 221 is displayed on the input panel 210, and a user selects an MFP to register a job on this screen (herein, the MFP 11 is selected).

Figure 3C:
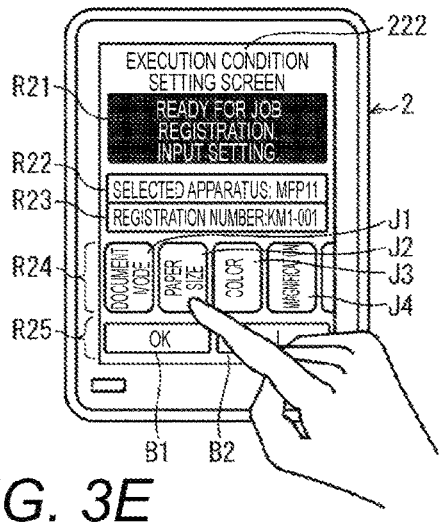

The MFP selection screen 221 includes a message region R11 displaying a message to prompt a user to input, an icon region R12 displaying icons for selecting MFPs (icons D1 to D4 showing the MFPs 11 to 14), and a button region R13 including a button B1 for determining a selected MFP and a button B2 for cancellation. After an MFP of a preregistration destination is selected, an execution condition setting screen 222 of a job to be preregistered is displayed on the input panel 210 (FIG. 3C).

Figure 3D:
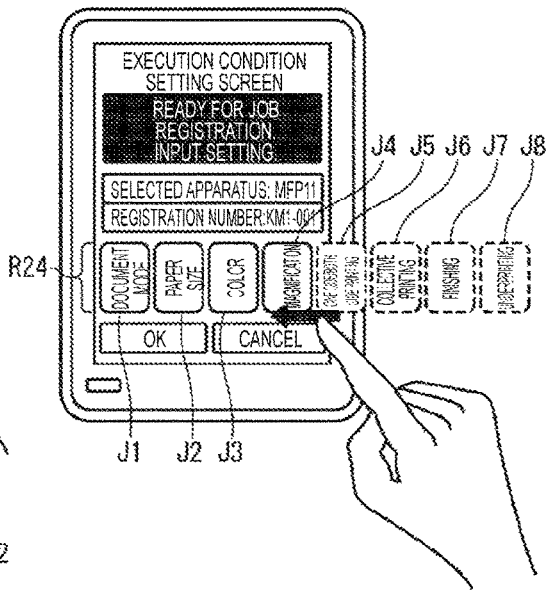

The execution condition setting screen 222 includes a message region R21, a region R22 displaying a name of a selected apparatus, a region R23 displaying a registration number, an icon region R24 displaying icons showing items of an execution condition, and a button region R25. The icon region R24 can be scrolled to right and left. For example, as illustrated in FIG. 3D, icons J1 to J8 respectively showing a document mode, a paper size, color printing, magnification, one side/both side printing, collective printing, finishing, and underprinting are displayed in this sequence.

A type and a sequence of job execution conditions being displayed on the icon region R24 differ depending on an MFP to preregister a job. Herein job execution condition information i1, which can be set to an MFP herein to preregister a job, is acquired, and job execution conditions are displayed based on an acquired result (a detail will be described below.). The job execution condition information i1 includes information on a priority order for determining a display sequence as well as a type of settable execution conditions (for example, types of execution conditions are arranged in descending order of priority). This priority order of execution conditions is, for example, determined by a user setting frequency acquired as a result of an experiment or a measurement.

Also, execution conditions are arranged in a hierarchical structure. For example, each mode of "Word", "Word/Photo", and "Photo" is arranged at a lower hierarchical level of a document mode, and A4 portrait size, A4 landscape size, A5 portrait size, and A5 landscape size are arranged at a lower hierarchical level of a paper size. Hereinafter, icons showing items on a higher hierarchical level are called "an item icon", and an icon to be actually set as an execution condition on a lower hierarchical level is called "a setting icon".

Figure 3E:
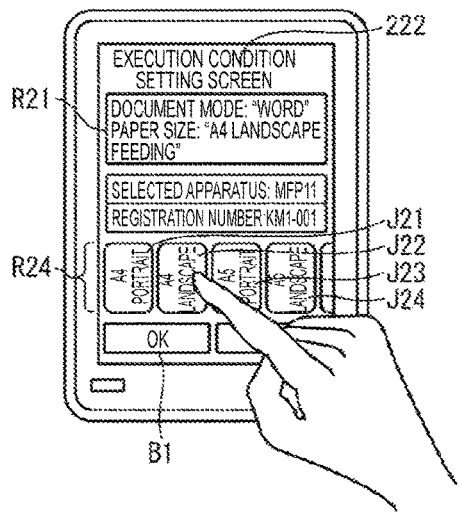

When a user selects (taps), for example, an item icon J2 (a paper size), the icon region R24 displays setting icons J21 to J24 respectively showing A4 portrait size, A4 landscape size, A5 portrait size, and A5 landscape size (FIG. 3E). Herein, when any of the sizes is selected (tapped), the content thereof is displayed on the message region R21. When a user taps an OK button B1, the size is determined as a paper size, and the icon region R24 is switched to a screen displaying item icons J1 to J8, which is at a higher hierarchical level of execution conditions (see FIG. 3C).

Figure 4:
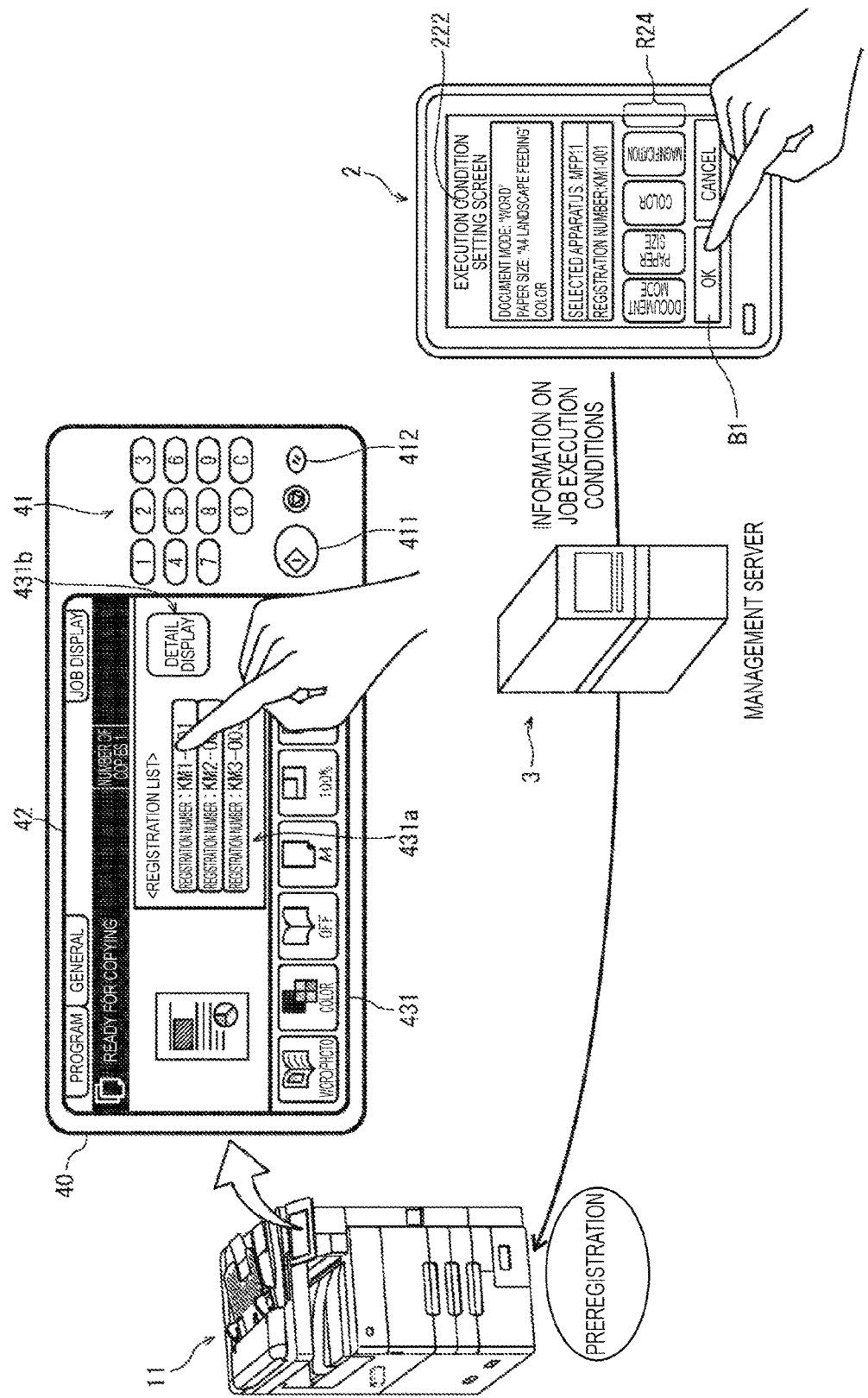
FIG. 4 is a view illustrating an example of a screen displaying, on a registration list of an operation panel, an execution condition of a job set from the portable terminal and sent to the MFP.

After each execution condition is set as above, as illustrated in FIG. 4, when a user taps the OK button B1, set job execution condition information is sent to the selected MFP 11 (selected on the MFP selection screen 221) through the management server 3, and the MFP 11 preregisters a job based on received execution conditions. Then, a user can execute a registered job by selecting (tapping) the registered job from a registration list 431a displayed on the operation panel 40 (see an enlarged view of FIG. 4), and tapping the start button 411.

Figure 5:
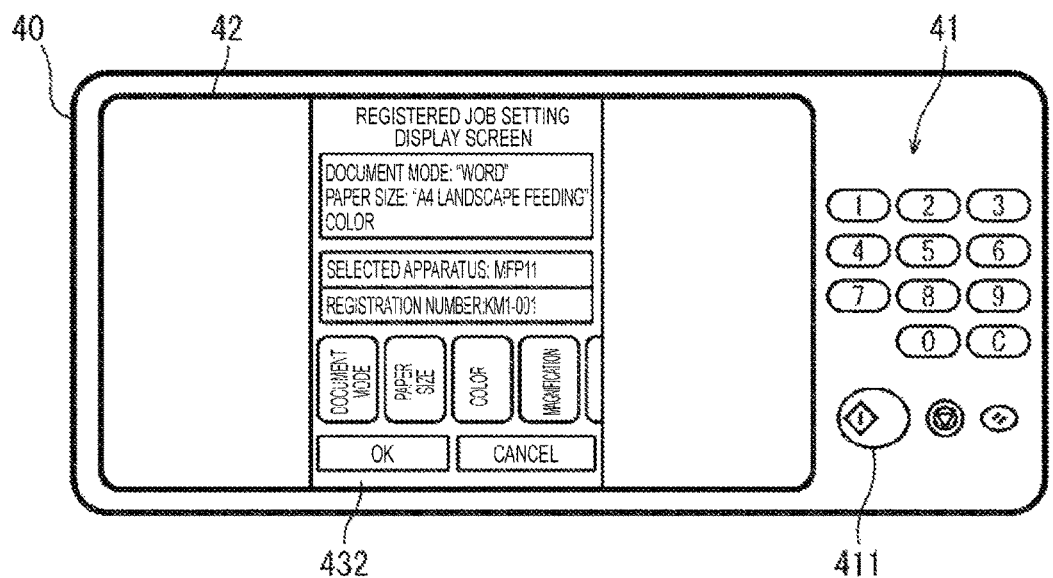
FIG. 5 is a view illustrating an example of a screen displaying a set content of a preregistered job on the operation panel.

In the case where a user confirms or changes a set content of a registered job, the user selects the registered job from the job registration list 431a, and then taps a detail display button 431b. As a result, a registered job setting display screen 432 is displayed (see FIG. 5), and the user can confirm or change the set content. Also, in the present embodiment, in view of operability, a layout of the registered job setting display screen 432 is arranged in accordance with a layout of the job execution condition setting screen 222 of the portable terminal 2 at a time of setting execution conditions. As a result, a user can operate similarly to an operation at a time of setting the job execution conditions, and operability for a user can be improved.

Although a case where the MFP 11 is selected has been exemplarily described above, a case where the MFPs 12 to 14 are selected is also similar except for a display content (a type and a sequence) of settable execution conditions.

Figure 6:
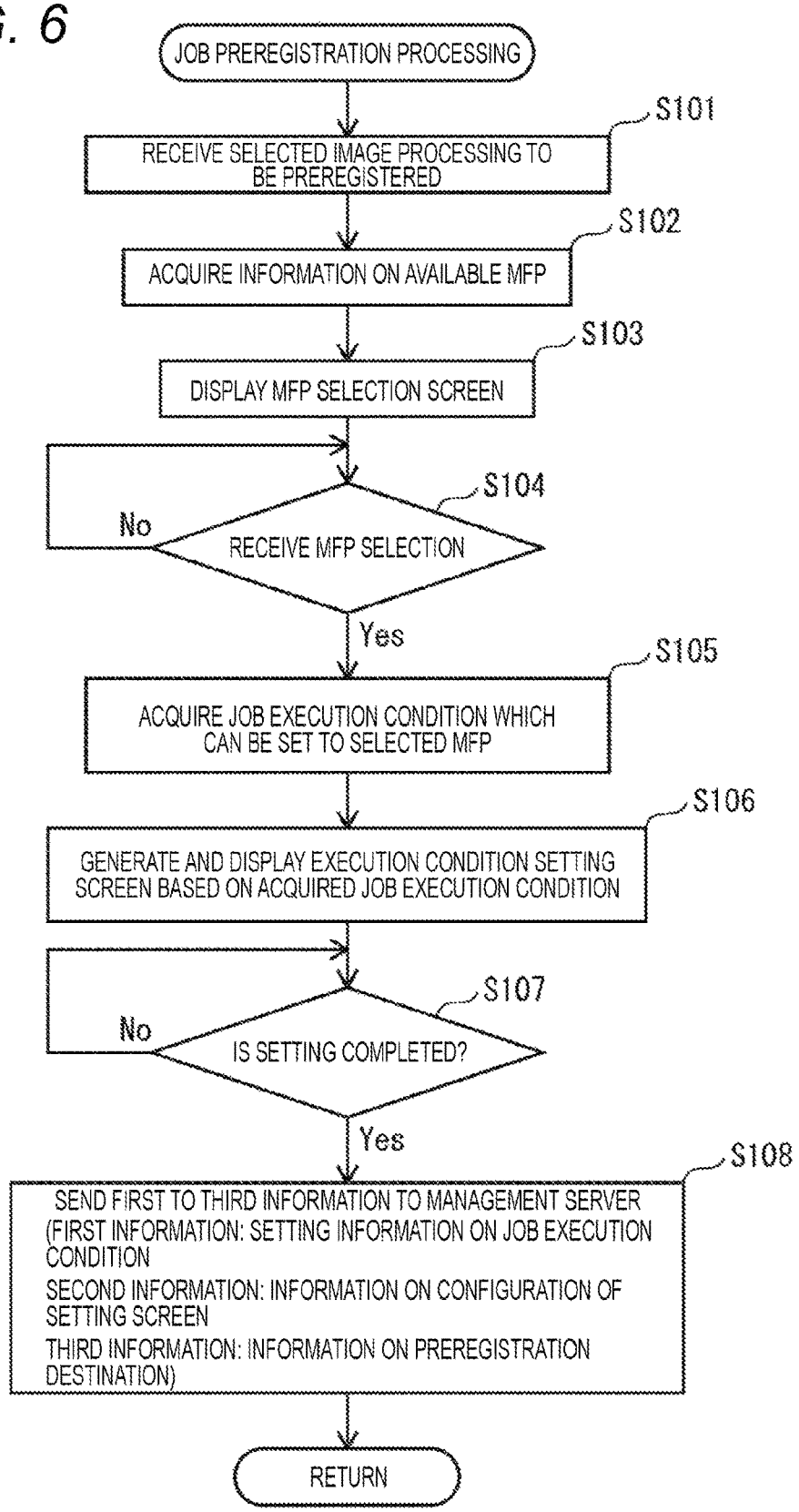
FIG. 6 is a flowchart illustrating an example of control of "job preregistration processing" by a control unit of the portable terminal.

(4) Job preregistration processing in a portable terminal: FIG. 6 is a flowchart illustrating an example of control of "job preregistration processing" by the control unit 200 of the portable terminal 2.

When the control unit 200 receives a selection of a copy, a scan, or a facsimile on the preregistration menu screen 220 (FIG. 3A) (step S101), the control unit 200 first acquires information on available MFPs from the management server 3 (step S102). The management server 3, as illustrated in the communication sequence diagram of FIG. 7, sends a ping command to the MFPs 11 to 14 at a predetermined interval (Q1), and constantly monitors connection to the LAN 4. The management server 3 determines whether the MFPs can be used by confirming the connection depending on whether there is a response signal (Q2).

In the case where the management server 3 is requested by the portable terminal 2 to provide information on available MFPs (Q3), the management server 3 sends, to the portable terminal 2, information (for example, an IP address, a host name on a network, an apparatus name, and a model code) on MFPs which are determined to be available (Q4). With reference to FIG. 6 again, next, the control unit 200 generates the MFP selection screen 221 and displays the screen on the input panel 210 based on acquired information on available MFPs (step S103). Specifically, for example, in the case where there is an MFP which cannot be used (in any of the MFPs 11 to 14), an icon showing that MFP is not displayed on the MFP selection screen 221, or a dummy icon, which cannot be selected even if it is displayed, is used.

Then, the MFPs are selected by a user (step S104: Yes), and the job execution condition information i1, which can be set to the selected MFPs, is requested to and acquired from the management server 3 (step S105) (see Q5 and Q6 in FIG. 7). After acquisition, the control unit 200 generates the execution condition setting screen 222 and displays the screen on the input panel 210 based on the job execution condition information i1 (step S106).

Figure 8:
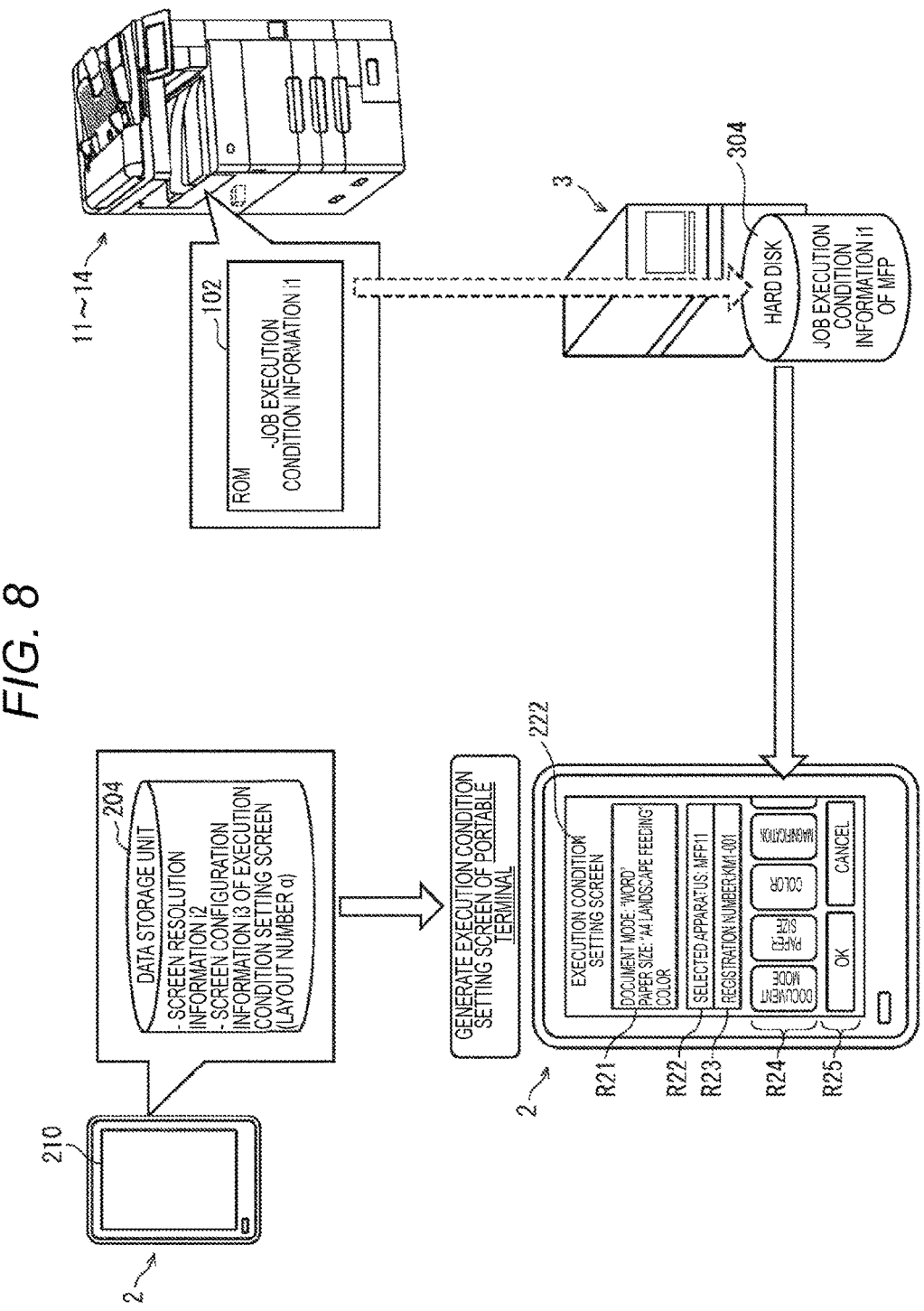
FIG. 8 is a view for describing a method of generating an execution condition setting screen of the portable terminal.

The screen generation will be described in detail with reference to FIG. 8. As illustrated in FIG. 8, the data storage unit 204 of the control unit 200 stores screen resolution information i2 and screen configuration information i3 of the execution condition setting screen 222. The screen resolution means "a total pixel number", which can be displayed on the input panel 210, and is herein assumed to be, for example, 960×540 (length×width) (see FIG. 9A, too). In the portable terminal 2, a configuration of the execution condition setting screen 222 (for example, a size and an arrangement position of each of the regions R21 to R25) is determined in view of user operability depending on the size of this screen resolution, and is stored as the screen configuration information i3.

The screen configuration information i3 includes, as illustrated in FIG. 9B, layout information β on a size and an arrangement position of each display region, a size and an arrangement interval of icons, and a layout number α thereof. Each of the regions R21 to R25 on the execution condition setting screen 222 is generated based on this screen configuration information i3.

Icons of execution conditions, which are displayed on the icon region R24, are generated, as described above, based on the job execution condition information i1 which is acquired from the management server 3, and displayed based on information on a priority order included in the job execution condition information i1. On the selected apparatus display region R22 on the execution condition setting screen 222, apparatus names of the MFPs, which are selected in the above step S104 (MFPs 11 to 14) are displayed. On the registration number display region R23, a registration number (for example, "an apparatus name of a portable terminal+a sequence number") is generated and displayed. Herein, an apparatus name of the portable terminal 2 is assumed to be "KM1".

Figure 7:
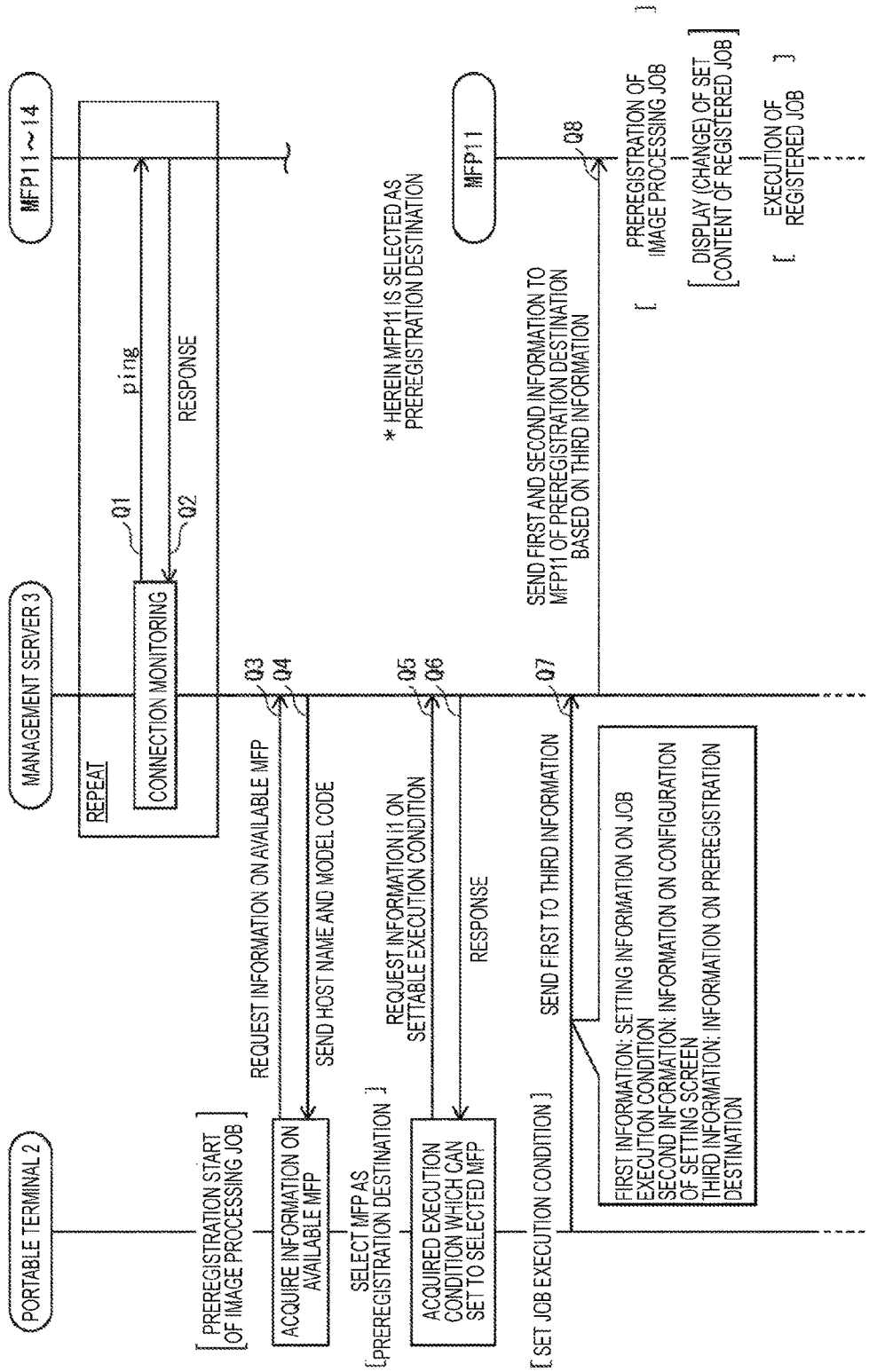
FIG. 7 is a communication sequence diagram among the MFPs, the management server, and the portable terminal.

With reference to FIG. 6 again, in the case where a user taps the OK button B1, and setting of job execution conditions is determined to be completed in step S107 (Yes), the control unit 200 sends, to the management server 3, setting information on job execution conditions including a registration number (first information x1), information on a configuration of a setting screen (second information x2), and address information on MFPs to preregister a job (third information x3) (step S108) (refer to Q7 in FIG. 7). After the information has been sent, the process is returned.

Herein, a screen layout number α is sent as the second information x2 (refer to FIG. 9B), and an IP address or a host name is sent as the third information x3. This is the end of "job preregistration processing" by the portable terminal 2. Then, the management server 3, which has received the first to third information x1 to x3, sends the first and second information x1 and x2 to MFPs to preregister a job, based on the third information x3 (Q8 in FIG. 7), as illustrated in FIG. 7.

Figure 10:
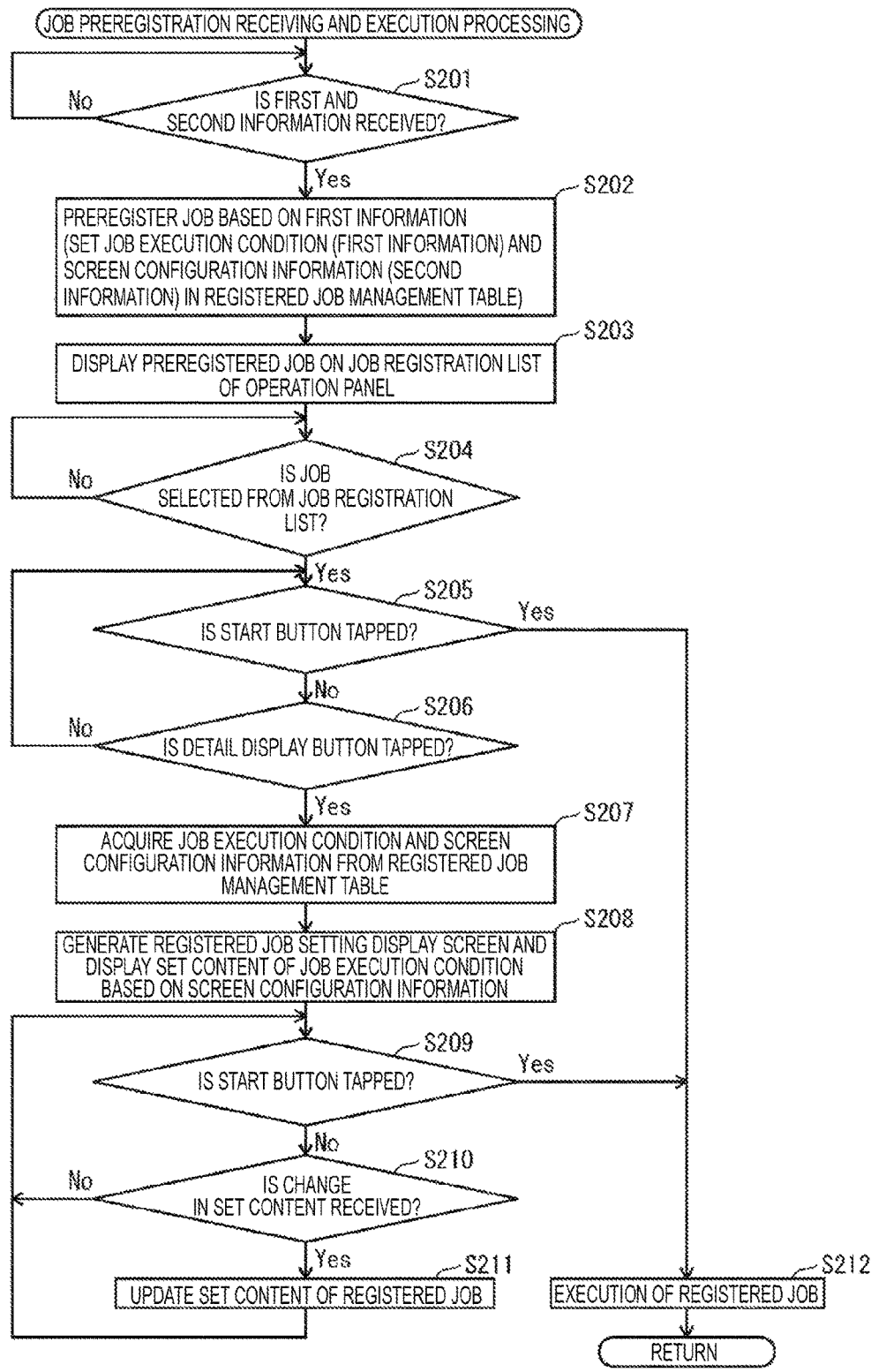
FIG. 10 is a flowchart illustrating an example of control of "job preregistration receiving and execution processing" by a control unit of the MFP.

(5) Job preregistration receiving and execution processing by MFPs: FIG. 10 is a flowchart illustrating an example of control of "job preregistration receiving and execution processing" by the control unit 50 of each of the MFPs 11 to 14.

This control is performed as a subroutine of a main flowchart (not illustrated in the figure) for totally controlling each of the MFPs 11 to 14. Herein, a case where the MFP 11 is selected by a user is described. The control unit 50 of the MFP11 first preregisters an image processing job based on the first information x1 (step S202) upon receiving the first and second information x1 and x2 (step S201: Yes).

Herein preregistration is performed by setting a job registration number and each execution condition of the first information x1 to a registered job management table T1 (see FIG. 11A) of the hard disk 54. Also, the registered job management table T1 includes a configuration information column t11 of a screen displaying a set content of a registered job. The column t11 stores second information x2 (a screen layout number α in the present embodiment).

Then, the control unit 50 displays such a registered job on the job registration list 431a of the operation panel 40 (step S203). Then, a user sets documents on the document mounting platform 31, selects (taps) a registered job (for example, a copy job) from the job registration list 431a (step S204: Yes), and then taps the start button 411 on the operation panel 40 (step S205: Yes). As a result, the control unit 50 executes the selected registered job (step S212). As a result, each of documents set on the document mounting platform 31 is fed and carried, and document images are read and printed (copied) on recording sheets.

After this, the process is returned to the unillustrated main flowchart. On the other hand, in the case where a user taps the detail display button 431b after the above step S204 (step S206: Yes), first the control unit 50 acquires screen configuration information (herein, just a screen layout number α) with a job execution condition from the registered job management table T1 (step S207).

In the present embodiment, specific screen configuration information, such as layout information β stored in the screen configuration management table T2 (see FIG. 11B) and screen resolution information i2, is acquired from the acquired screen layout number α. The layout information β acquired from the screen configuration management table T2, and the layout information β of the screen configuration information i3 stored in the data storage unit 204 of the portable terminal 2, are assumed to be a similar content.

Figure 12:
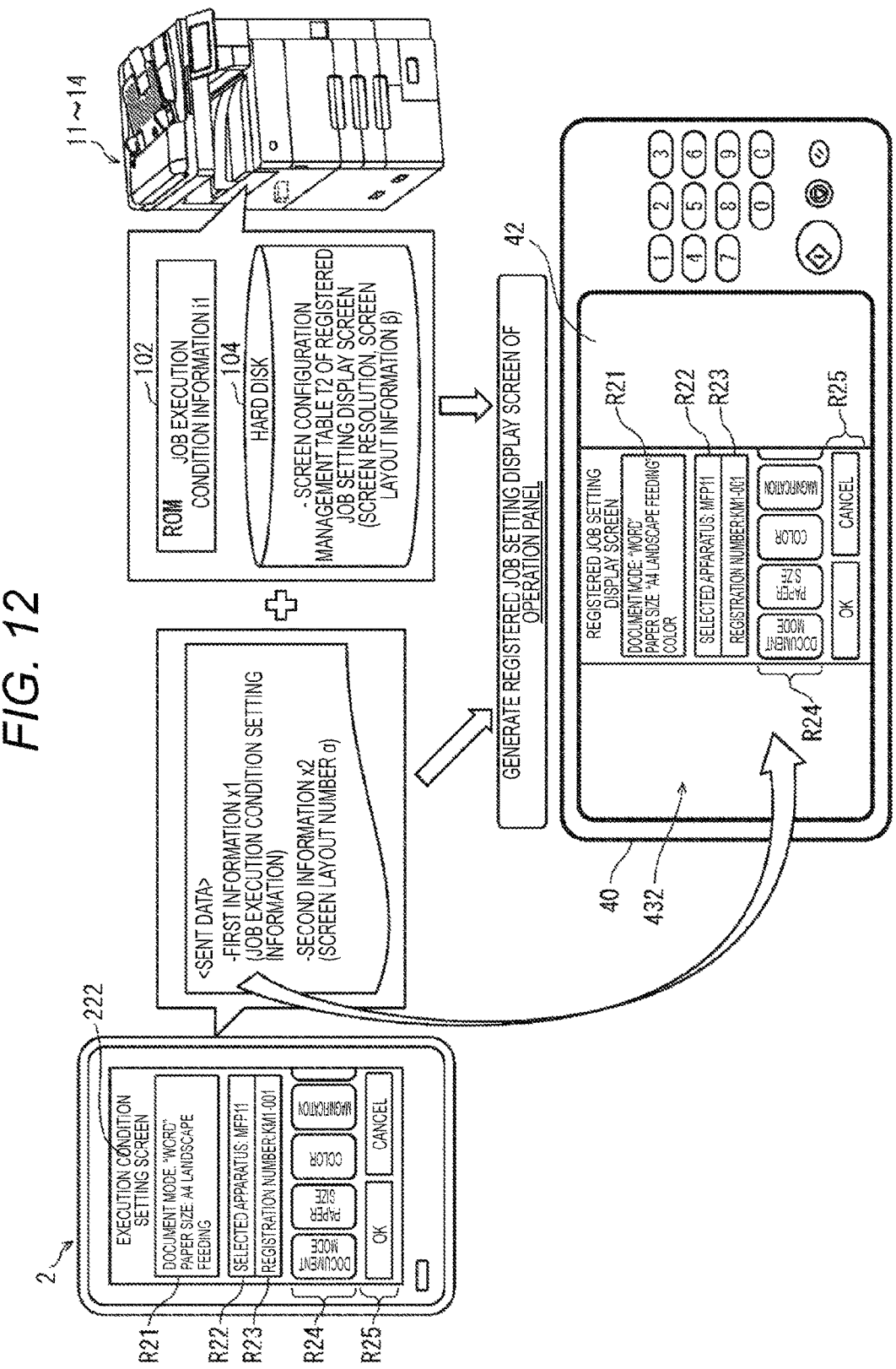
FIG. 12 is a view for describing a method of generating a registered job setting display screen displayed on the operation panel of the MFP.

In order to handle a portable terminal having a different screen resolution, layout information β of each of multiple screen resolutions and layout numbers α thereof are stored in this screen configuration management table T2. Next, the control unit 50, based on the thus acquired screen configuration information (layout information β and screen resolution information i2), generates the registered job setting display screen 432 in accordance with a screen layout of the execution condition setting screen 222 of the portable terminal 2, and displays the screen on the operation panel 40 after a set content of execution conditions of a registered job is reflected (step S208) (see FIG. 12).

Then, when a user taps the start button 411 (step S209: Yes), a job displayed on the registered job setting display screen 432 is executed (step S212), and the process is returned to the unillustrated main flowchart. On the other hand, in the case where a change in an execution condition is received from the registered job setting display screen 432 (step S210: Yes) before the start button 411 is tapped (step S209: No), a set content of a registered job is updated (step S211).

This is the end of "job preregistration processing" by the portable terminal 2. In the image processing system 1 with the above configuration, the portable terminal 2 sends, to the MFPs 11 to 14, information on a configuration of the execution condition setting screen 222 (the second information x2) together with execution condition setting information of an image processing job (the first information x1). Then, the MFPs 11 to 14 preregister the image processing job based on the first information x1, and generate the registered job setting display screen 432 displaying a setting content of the registered job based on the second information x2.

As a result, a layout of the registered job setting display screen 432 can correspond to a layout of the execution condition setting screen 222 of the portable terminal 2, and operability is improved since a user is not confused at operation when changing a set content of execution conditions from the registered job setting display screen 432. In the present embodiment, a touch panel-type input panel 210 and the control unit 200 at a time of performing step S104 in FIG. 6 of the portable terminal 2 are included in the registration destination receiving unit, which receives, from a user, a selection of an image processing apparatus to preregister a job. Also, the input panel 210 and the control unit 200 at a time of performing step S107 in FIG. 6 of the portable terminal 2 are included in the setting receiving unit, which receives a setting input by a user from a condition setting screen for setting execution conditions. When performing step S108 of FIG. 6, the control unit 200 of the portable terminal 2 functions as a sending unit configured to send the first and second information to an image processing apparatus selected in the registration destination receiving unit.

Also, the control unit 200 of the portable terminal 2 functions as an apparatus information acquisition unit, which acquires information on available image processing apparatuses when performing step S102 of FIG. 6, and functions as a first screen generation unit, which generates an apparatus selection screen for selecting an image processing apparatus when performing step S103 of FIG. 6. Furthermore, the control unit 200 of the portable terminal 2 functions as an execution condition acquisition unit configured to acquire execution conditions of image processing, which can be set to an image processing apparatus having been selected as a preregistration destination when performing step S105 of FIG. 6, and functions as a second screen generation unit configured to generate a condition setting screen when performing step S106 of FIG. 6.

The control units 50 of the MFPs 11 to 14 function as a preregistration unit configured to preregister an image processing job when performing step S202 of FIG. 10. Also, the control units 50 of the MFPs 11 to 14 function, when performing S208 of FIG. 10, as a display control unit configured to generates a job setting display screen displaying a set content of execution conditions of a preregistered image processing job based on the second information, and display the screen on an operation panel.

<Second Embodiment>

(1) Summary: The image processing system according to the second embodiment is different from that of the first embodiment, which selects one MFP, in that multiple MFPs can be selected as a preregistration destination of an image processing job from a portable terminal.

In the first embodiment, even if a plurality of MFPs can be used, one MFP is selected as a preregistration destination of a job. Therefore, in the case where an MFP which has preregistered a job has a trouble such as a paper jam, there is a problem that a user has to wait until the trouble is solved, or the job has to be preregistered again to another MFP when the user cannot wait. Also, even if there is no trouble, in the case where a large volume of print processing is ongoing or users are waiting in line for a copy, a scan and a facsimile, the registered job cannot be executed immediately, and the above problem occurs.

Figure 13A:
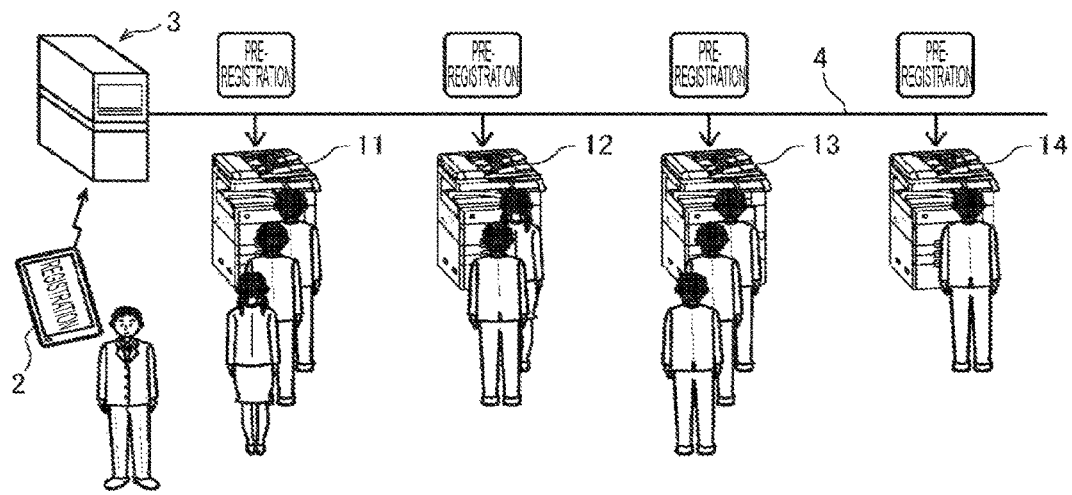
FIGS. 13A to 13C are views for describing an outline of an image processing system according to a second embodiment.
Figure 13B:
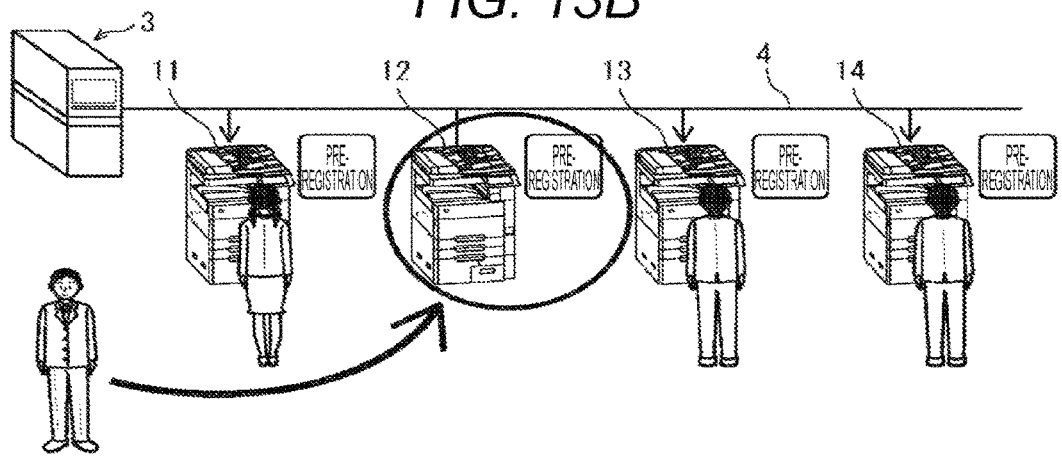

On the other hand, in the present embodiment, multiple job preregistration destinations can be selected at a time (FIG. 13A). Therefore, even if a registered job cannot be executed immediately by one MFP, the registered job can be executed without being registered again if other selected MFPs can execute the job (FIG. 13B). As a result, a user can save a trouble of preregistering a job again, and save a waiting time.

A basic system configuration is similar to that of the first embodiment, and therefore, a similar configuration will be denoted with a similar sign, and description thereof will be omitted.

Figure 14A:
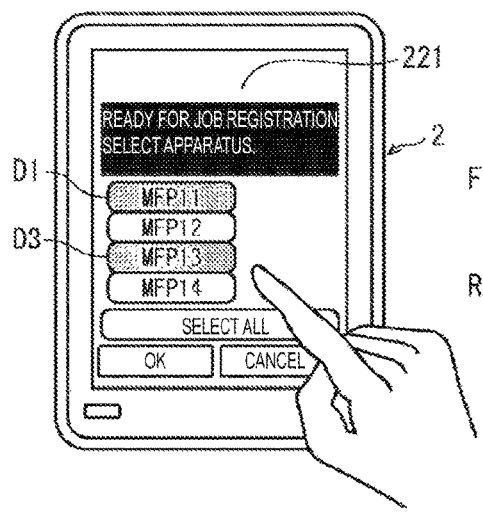
FIGS. 14A and 14B are views illustrating exemplary screens in the case where two job preregistration destinations are selected from a portable terminal.
Figure 15A:
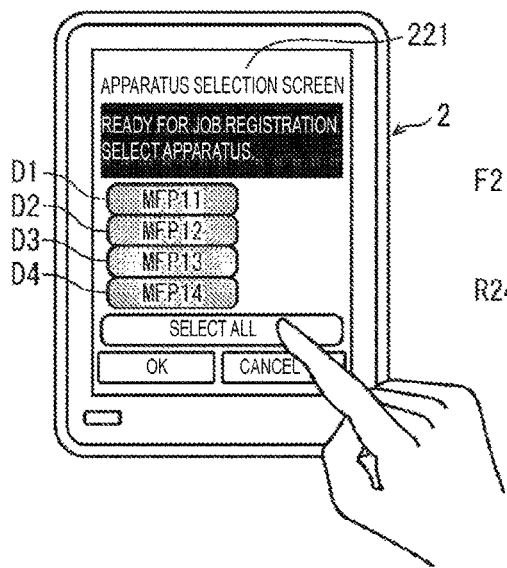
FIGS. 15A and 15B are views illustrating exemplary screens in the case where all of available MFPs are selected from the portable terminal as a job preregistration destination.

(2) Selection of multiple preregistration destinations: In the present embodiment, for example, as illustrated in FIG. 14A, both of the MFPs 11 and 13 (both are a color multifunction printer.) can be selected on the MFP selection screen 221 of the portable terminal 2, or all of the MFPs 11 to 14 can be selected as illustrated in FIG. 15A.

Herein, a select-all icon D9, which can select all of available MFPs at a time, is provided to improve operability in the case of selecting all of the MFPs. A user may tap icons D1 to D4 of the MFPs 11 to 14 one by one in order to select all of them. In the case where multiple MFPs are selected as a preregistration destination as described above, job execution conditions, which can be set to the MFPs, are more likely to be different among the MFPs if the models of the selected MFPs are different.

Hereinafter, execution conditions which can be set to all of selected MFPs are called "common execution conditions". Execution conditions which can be set to a part of selected MFPs and are not common to the MFPs are called "non-common execution conditions". If non-common execution conditions can be set among selected MFPs on the execution condition setting screen 222, the non-common execution conditions may not be applicable to an MFP which has preregistered a job and will execute the job, and a user who has set the conditions might be confused.

Therefore, it is preferred that non-common execution conditions cannot be set among selected MFPs on the execution condition setting screen 222. In the present embodiment, icons of the non-common execution conditions are used as dummy icons, which are just displayed and do not respond (function) even if being tapped (see FIGS. 14B and 15B). Also, icons of common execution conditions are preferentially arranged ahead of the dummy icons (in order from front), so that screen scrolling by a user is reduced, and execution conditions can be easily set. Also, a color of dummy icons is differentiated from a color of icons of common execution conditions for easily distinguishing the dummy icons (for example, gray neutral color or light color for dummy icons).

Figure 14B:
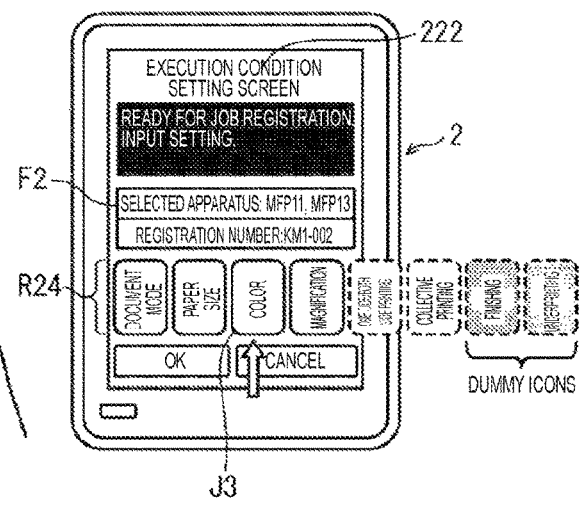
Figure 15B:
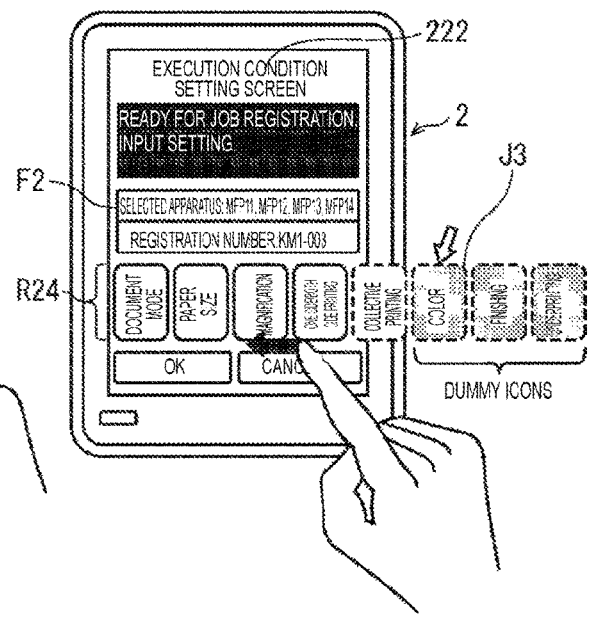

FIG. 14B is a view illustrating the execution condition setting screen 222 after the MFPs 11 and 13 have been selected. FIG. 15B is a view illustrating the execution condition setting screen 222 after all of the MFPs 11 to 14 have been selected. As is obvious in comparison with both figures, for example, although an icon J3 indicating color printing is displayed as an selectable item icon in FIG. 14B, in which color multifunction printers (the MFPs 11 and 13) are selected, the icon J3 is displayed as a dummy icon and aligned after the selectable item icons in FIG. 15B, in which black and white multifunction printers (the MFPs 12 and 14) are included.

Herein, the reason for displaying icons of non-common execution conditions by dummy icons is that the icons can be set depending on an MFP executing a registered job, and dummy icons play a role in notifying a user of that. When an MFP executes a job after the job has been preregistered, if the non-common execution conditions can be set to the MFP, the execution conditions can be set from the operation panel 40.

Figure 16:
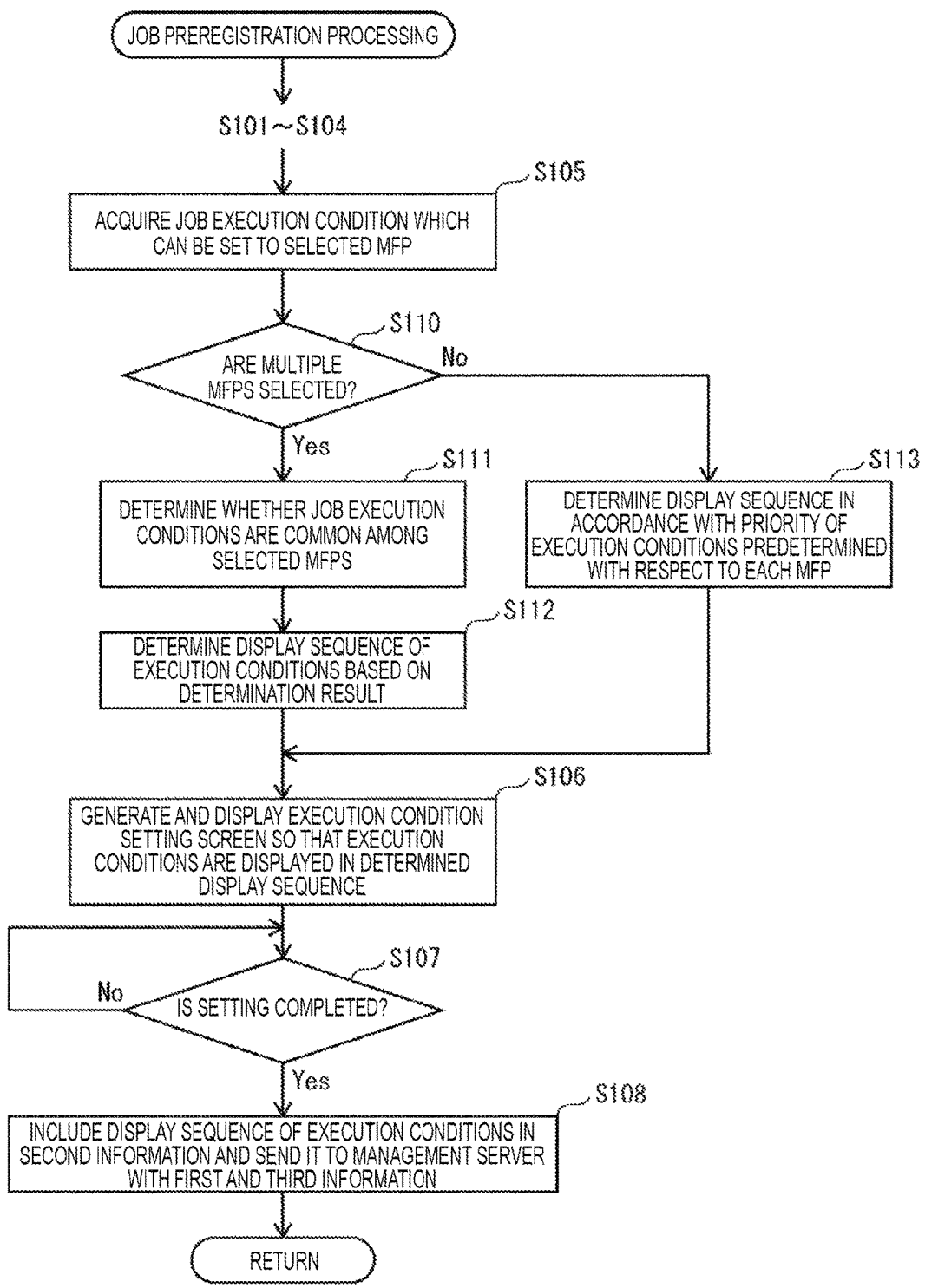
FIG. 16 is a flowchart illustrating an example of control of "job preregistration processing" by a control unit of the portable terminal according to the second embodiment.

(3) Job preregistration processing in a portable terminal: FIG. 16 is a flowchart illustrating an example of control of "job preregistration processing" by the control unit 200 of the portable terminal 2 according to the present embodiment, and mainly illustrating a process different from the process in the flowchart of FIG. 6. A process similar to the process in FIG. 6 is denoted with a same step number and description thereof is simplified or omitted.

In the present embodiment, as illustrated in FIG. 16, the control unit 200 requests and acquires, from the management server 3, the information i1 on job execution conditions which can be set to a selected MFP (each of MFPs when multiple MFPs are selected.) in step S105. Next, if multiple MFPs are selected (step S110: Yes), the control unit 200 first determines whether job execution conditions accepted from a user are common among the MFPs (step S111). The control unit determines, for example, by generating an execution condition determination table T3 as illustrated in FIGS. 17A and 17B based on the information i1 on job execution conditions applicable to each MFP, which has been acquired from the management server 3.

FIG. 17A is a table illustrating an example of the execution condition determination table T3 at a time when the MFPs 11 and 13 are selected. FIG. 17B is a table illustrating an example of the execution condition determination table T3 at a time when all of the MFPs 11 to 14 are selected. A procedure for determining whether an execution condition is common among MFPs is herein described by using the execution condition determination table T3 of FIG. 17A.

As illustrated in the figure, columns L1 and L2 of the execution condition determination table T3 describe execution conditions, for example, from the top in accordance with a priority determined in advance based on a setting frequency by a user. Also, next to the columns, columns t31 and t32 (columns of the MFP 11 and the MFP 13) showing whether the execution conditions are applicable to selected MFPs are provided. The control unit 200 registers, in each of the columns t31 and t32 of the MFPs 11 and 13, "o" in the case where such execution conditions are applicable and "x" in the case where such execution conditions are not applicable, based on job execution condition information i1 from the management server 3.

As a result, execution conditions applicable ("o") to both of the columns t31 and t32 are determined to be common between the MFPs 11 and 13 and registered as "o" in a common function column C1, and execution conditions not applicable to both of the columns t31 and t32 are determined not to be common (non-common) between the MFPs 11 and 13 and registered as "x" in the common function column C1. Furthermore, regarding execution condition items L1, if there are multiple common items in execution conditions L2 in a lower hierarchical level, the control unit 200 determines the items as common execution condition items, which can be set to the MFPs 11 and 13, and registers "o" in a common item column C2. In the case where no or one execution condition is common, there is no choice and a setting is not changed, and therefore the execution conditions are not determined as items of common execution conditions, which can be set, and the control unit 200 registers "x" in the common item column C2.

Magnification can be set anywhere between 50 to 200%, and therefore "o" is registered in the common item column C2. In the execution condition determination table T3 illustrated in FIG. 17B, in which all of the MFPs 11 to 14 are selected, black and white multifunction printers (the MFPs 12 and 14) are included, and therefore execution conditions for color printing are determined not to be common among the MFPs 11 to 14, and "x" is registered in the common function column C1 and the preferential arrangement column C2. Also, since the MFP 12 does not have document modes of "Word/Photo" and "Photo", each of the modes is registered as "x" in the common function column C1 and the preferential arrangement column C2.

Then, the control unit 200 reads execution condition items which have been set as "o" in the common item column C2 from the top, and then reads execution condition items which have been set as "x" from the top. The order of reading is determined as a display sequence of execution conditions (step S112). On the other hand, in the case where one MFP is selected (step S110: No), a display sequence is determined in order of priority of execution conditions determined in advance as described above with respect to each MFP (for example, based on a setting frequency by a user) (step S113).

After a display sequence is determined as above, in step S106, the control unit 200 generates the execution condition setting screen 222 so that item icons of execution conditions are displayed in the display sequence determined in the above step S112, in the icon region R24 on the execution condition setting screen 222, and displays the screen on the input panel 210. At this time, the control unit 200 displays dummy icons for execution conditions, which have been determined not to be common in the above step S111.

Then, when setting of job execution conditions by a user is completed (step S107: Yes), the first information x1, the second information x2, and the third information x3 are sent to the management server 3 after information on a display sequence of execution conditions is added to the second information x2 on a configuration of a setting screen (step S108).

Figure 18:
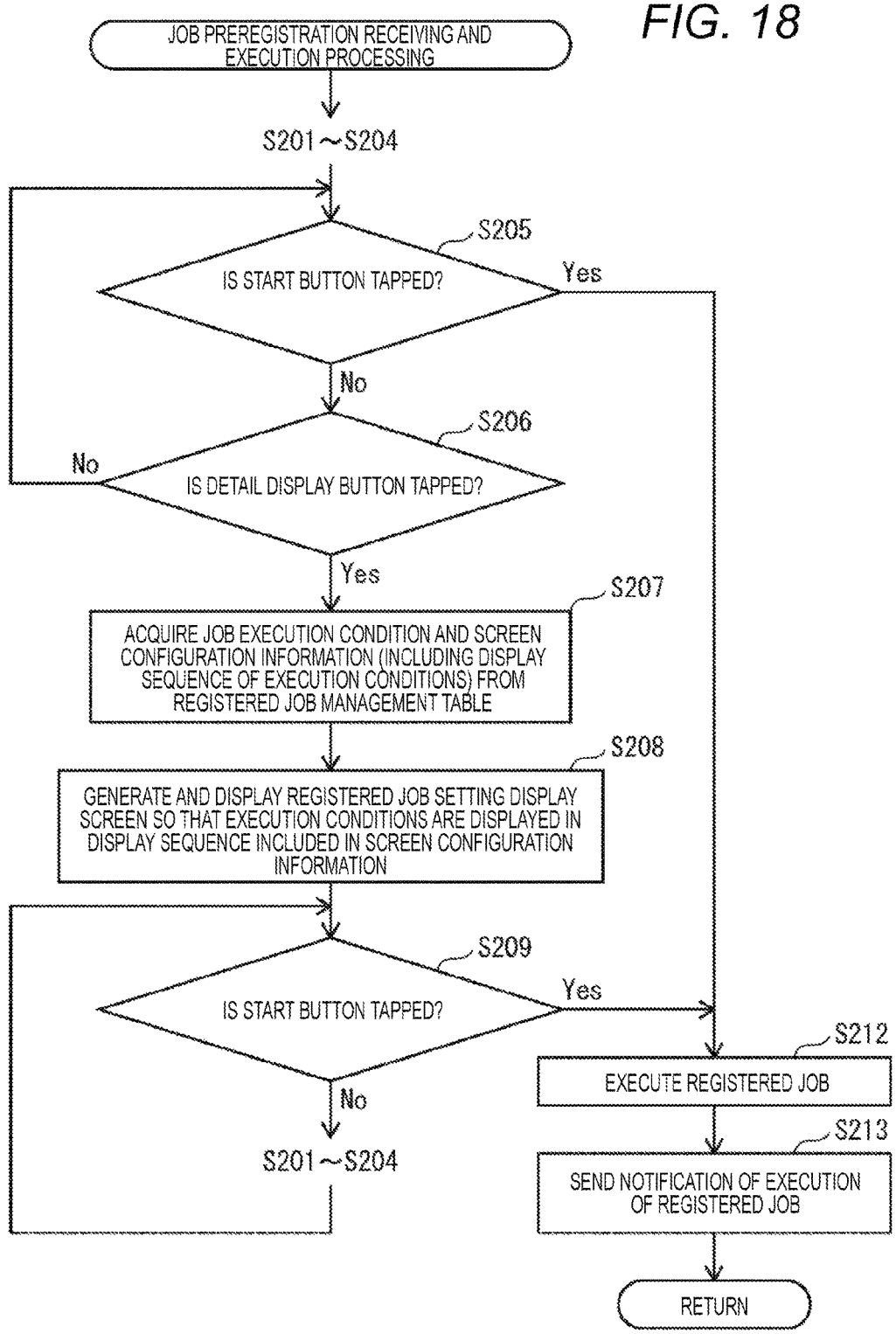
FIG. 18 is a flowchart illustrating an example of control of "job preregistration receiving and execution processing" by a control unit of the MFP according to the second embodiment.

(4) Display of a set content of a registered job in an MFP and execution processing: FIG. 18 is a flowchart illustrating an example of control of "job preregistration receiving and execution processing" by the control unit 50 of each of the MFPs 11 to 14 according to the present embodiment, and mainly illustrating just a process different from the process illustrated in the flowchart of FIG. 10. A process similar to the process of FIG. 10 is denoted with a same step number and description thereof is simplified or omitted.

In the present embodiment, a display sequence of execution conditions is included the second information x2. A display sequence of execution conditions with a screen layout number α is stored in a column t11 storing screen configuration information of the registered job management table T1 (see FIG. 11A). When a detail display button 431b of the operation panel 40 is tapped in step S206 of FIG. 18 (step S206: Yes), the control unit 50 acquires screen configuration information including a display sequence of execution conditions with job execution conditions from the registered job management table T1 (step S207), generates the registered job setting display screen 432 so that item icons of execution conditions are displayed in the display sequence, and displays the screen on the operation panel 40 (step S208).

If execution conditions displayed by dummy icons in the execution condition setting screen 222 of the portable terminal 2 can be set to individual MFPs which have preregistered a job, the execution conditions are displayed by icons, which can be set, not by dummy icons, so that a user can set the execution conditions from the operation panel 40. In this case, although a type of icons showing the execution conditions is changed, a display order is the same as the execution condition setting screen 222 of the portable terminal 2, and therefore a user can operate without being particularly confused.

When a start button 411 is tapped on the operation panel 40 (step S205: Yes, step S209: Yes), the control unit 50 executes a registered job (step S212) and sends, to the management server 3, a notification that the registered job has been executed (including a registration number) (step S213) (see Q9 in FIG. 19). Then, the process is returned to an unillustrated main flowchart.

(5) Functions of the management server: The management server 3 according to the present embodiment includes, in the hard disk 304, a transmitted and received data management table T4 (not illustrated in the figure), which stores and manages the first to third information x1 to x3 sent from the portable terminal 2.

Figure 19:
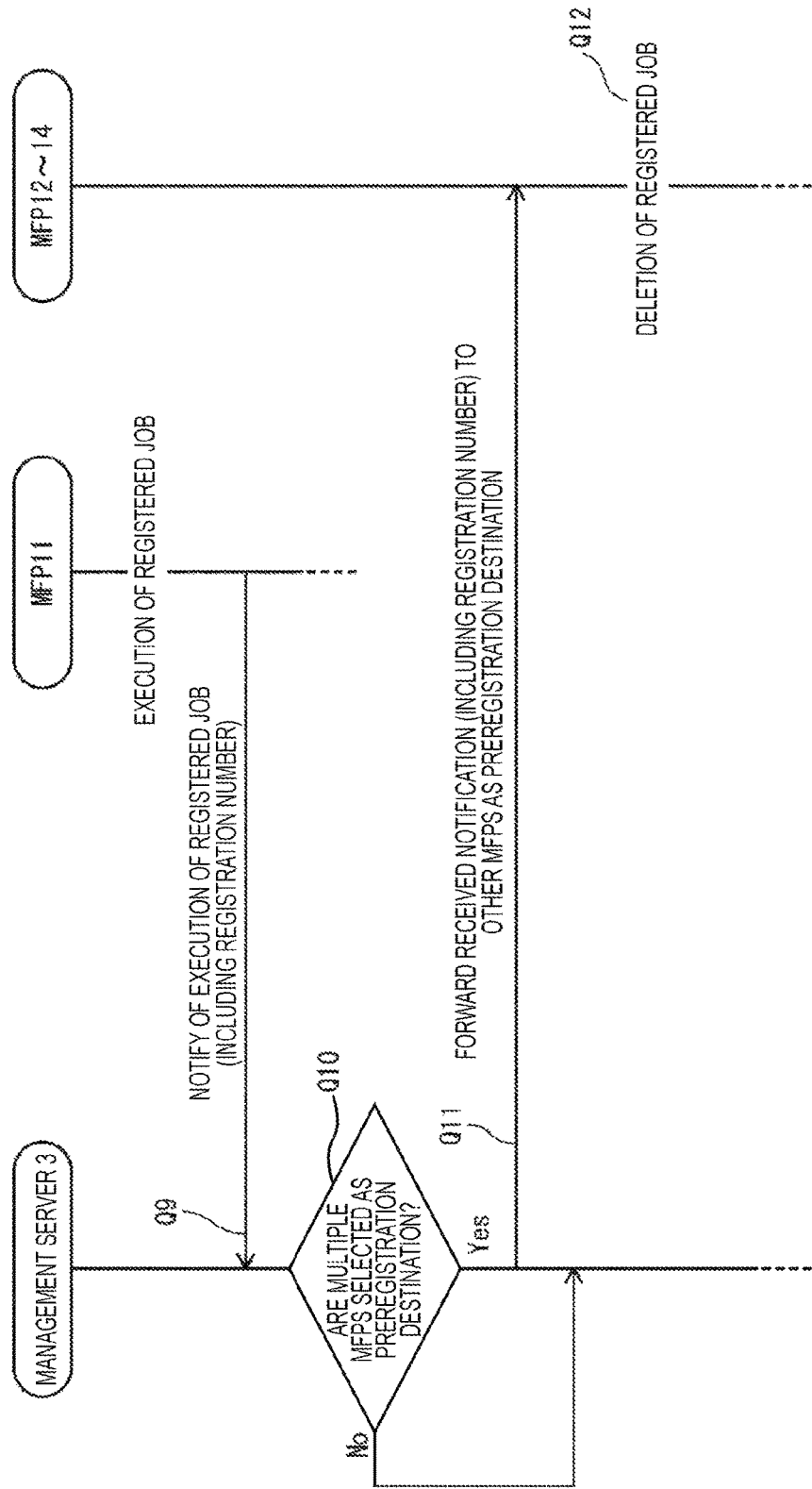
FIG. 19 is a communication sequence diagram between the MFPs and a management server.

FIG. 19 is a sequence diagram illustrating communication between the management server 3 and each of the MFPs 11 to 14 after execution of a registered job, in the case where a user registers a job in the MFPs 11 to 14, and the MFP 11 actually executes the registered job. As illustrated in the figure, upon receiving, from the MFP11, a notification that the above registered job has been executed (Q19 of FIG. 19), the control unit 300 of the management server 3 first reads the third information x3, which has been received with the first information x1 including a registration number in the notification, from the transmitted and received data management table T4 of the hard disk 304, and confirms whether there are multiple MFPs to preregister a job (Q10). In this example, since the MFPs 11 to 14 have preregistered a job, the control unit determines "Yes" in step Q10, and a notification that the registered job has been executed, which has been received from the MFP 11, is transferred to the MFPs (the MFPs 12 to 14) other than the MFP 11, which has executed the registered job, among preregistration destinations (Q11).

Figure 13C:
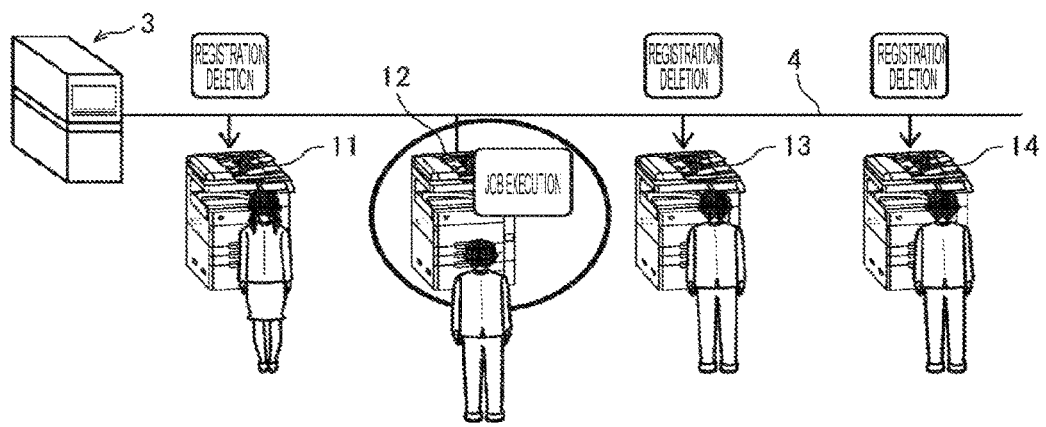

The MFPs 12 to 14 having received this notification delete, in its own apparatus, a registered job registered with the registration number in the notification (Q12) (see FIG. 13C, too). As a result, in the case where multiple MFPs are selected as a preregistration destination of a job, a user can save the trouble of deleting a registered job in MFPs which have not executed the job.

<Effect of Embodiments>

In an image processing system with the above configuration, a portable information terminal sends information on a configuration of a condition setting screen to an image processing apparatus in addition to information on execution conditions of image processing, and the image processing apparatus generates a job setting display screen based on the information on a configuration of a condition setting screen sent from the portable information terminal and displays the screen on an operation panel. Accordingly, a layout of the job setting display screen, which is displayed on the operation panel, can be arranged in accordance with a layout of the condition setting screen of the portable information terminal, and operability can be improved since a user is not confused at operation in the case where a set content of a job is confirmed on the operation panel.

<Variation>

The present invention is not limited to the above embodiments and the following variations can also be considered.

(1) The above embodiment is described, but not by way of limitation, that just a layout number α is sent to the MFPs 11 to 14 as information on a screen configuration of the execution condition setting screen 222 (the second information x2) to reduce a communication load between the portable terminal 2 and the MFPs 11 to 14.

In the case where it is determined that an impact of a communication load applied to an entire network is small, for example, instead of a layout number α, a screen resolution of the portable terminal 2, and layout information β including a size and an arrangement position of each display region of the execution condition setting screen 222 and a size and an arrangement interval of icons may be sent. As a result, the MFPs 11 to 14 can correspond to execution condition setting screens of portable terminals with any screen resolutions without storing layout information β depending on a variety of screen resolutions.

(2) The second embodiment has been described, but not by way of limitation, that dummy icons are used as icons of execution conditions which are not common among MFPs, on the execution condition setting screen 222 of the portable terminal 2, and the dummy icons are arranged in the back of a display sequence by lowering priority in comparison with icons of common execution conditions. For example, icons of non-common execution conditions may not be displayed on a screen.

In the case where non-common execution conditions are displayed by dummy icons, the dummy icons preferably may not be displayed before the execution condition setting screen 222 is operated (an initial state), from aspects of operability and overview. Also, a display sequence of execution conditions may not be changed regardless of whether the execution conditions are common among MFPs, and non-common execution conditions may be just displayed by dummy icons. Furthermore, the second embodiment has been described, but not by way of limitation, that a color of dummy icons is varied from a color of icons of common execution conditions so that the dummy icons can be easily distinguished.

Figure 20A:
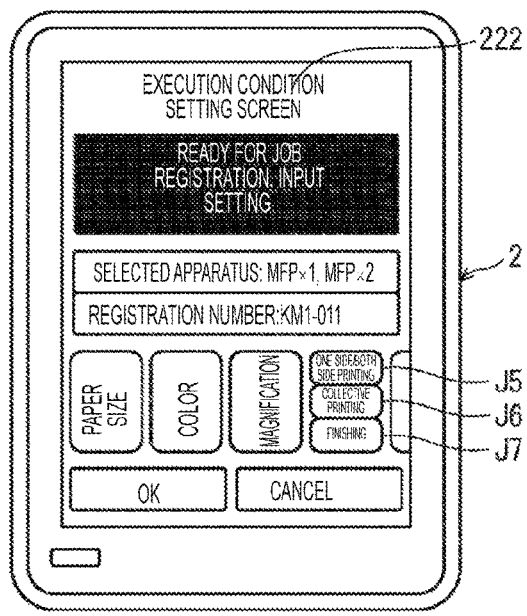
FIGS. 20A to 20C are views illustrating examples of an icon display on an execution condition setting screen of a portable terminal according to a variation.
Figure 20B:
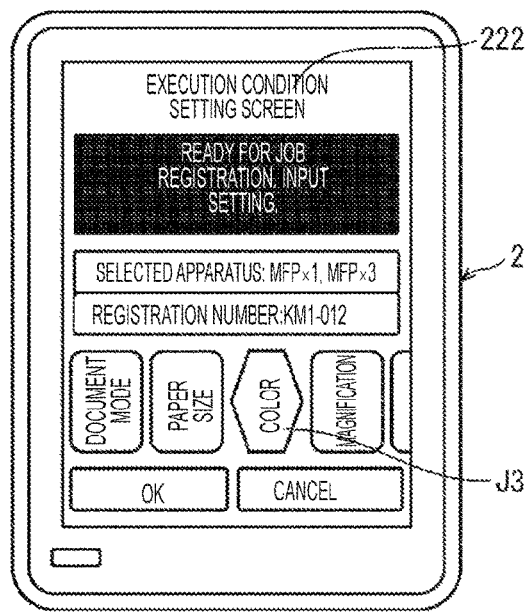
Figure 20C:
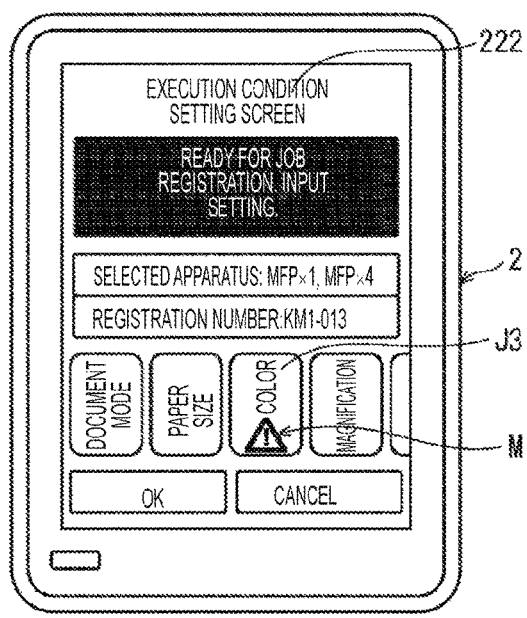

For example, icons can be downsized (see J5 to J7 in FIG. 20A), a form of icons can be changed (see J3 in FIG. 20B), and a warning instruction M can be superimposed on an icon (see J3 in FIG. 20C).

(3) In the second embodiment, a sequence of icons of execution conditions displayed on the portable terminal 2 is changed depending on a method of selecting (multiple selections) a preregistration destination of a job.

For example, as illustrated in FIGS. 21A to 21C, even if the MFP 11 is typically selected as one of preregistration destinations, execution conditions common among the MFPs are different if a different MFP (MFP 12, MFP 13 or MFP 14) is selected together (see FIG. 16). As a result, a display sequence of icons of execution conditions varies. For this reason, if jobs registered on each screen 222 of FIGS. 21A to 21C are selected one by one from the operation panel 40 of the MFP 11, which is a common preregistration destination (see FIG. 21D), and a set content of each job is displayed in order on the registered job setting display screen 432 generated based on a screen configuration (of the portable terminal 2) at a time of setting execution conditions, a user might be confused because a display sequence of execution conditions are different among the registered jobs.

Therefore, for a user not to be confused in operation, regarding jobs preregistered by the same portable terminal 2, execution conditions may be displayed in the same display sequence on the registered job setting display screen 432. For example, a display sequence of execution conditions on the registered job setting display screen 432 may be displayed in a predetermined sequence with respect to each MFP, in the same way as the first embodiment. As a result, when a registered job is executed by the same MFP, a display sequence of execution conditions on the registered job setting display screen 432 does not vary even if a method for selecting a preregistration destination is different, and it can prevent a user from being confused in operation.

Also, without fixing a display sequence to a predetermined sequence, for example, a display sequence may be conformed to a screen configuration (a display sequence of execution conditions) of the portable terminal 2 at a time of setting execution conditions of a latest job among multiple registered jobs, which have been registered from the portable terminal 2 (see FIG. 21E). FIG. 21E illustrates an example in which a display sequence of execution conditions of the registered job setting display screen 432 is similar to a screen 222 (FIG. 21C) at a time of setting execution conditions of a job being lately registered (registration number: KM1-003).

In this manner, an operation on the registered job setting display screen 432 can be proceeded in a similar way to the latest operation of a user (an operation for setting execution conditions in the portable terminal 2), and a user can operate based on his/her memory without confusion.

(4) In the above embodiment, a layout of the registered job setting display screen 432 displayed on the operation panel 40 corresponds to a layout of the execution condition setting screen 222 of the portable terminal 2 (see FIGS. 4 and 5). However, the layouts of both screens 432 and 222 do not necessarily completely correspond to each other.

For example, regarding regions which do not directly relate to operation, such as a message region R21, a selected apparatus display region R22, and a registration number display region R23, an arrangement position of each region may be different from the execution condition setting screen 222 as long as a user can confirm information of each region. Also, in the icon region R24, a size and a form of displayed icons of execution conditions may be varied from those of icons on the execution condition setting screen 222 to the extent that a user is not confused.

(5) The above embodiment has been described, but not byway of limitation, that the portable terminal 2 requests information on available MFPs to the management server 3, and receives an IP address, a host name on the network, an apparatus name, and a model code. However, as long as available MFPs are specified, just a host name may be sent, for example. Also, in a Windows network environment, a computer name can be used instead of a host name.

(6) The above environment has been described, but not by way of limitation, that the portable terminal 2 is connected to the management server 3 via Bluetooth. For example, the portable terminal 2 may be directly connected to the LAN 4 via Wi-Fi. In this case, the portable terminal 2 may directly communicate with each of the MFPs 11 to 14 without relaying the management server 3. More specifically, available MFPs may be confirmed by sending a ping command from the portable terminal 2 to each of the MFPs 11 to 14. Also, in the case where the portable terminal 2 directly acquires information on applicable execution conditions from each of the MFPs 11 to 14, or the LAN 4 is connected to the Internet, the portable terminal 2 may acquire information on applicable execution conditions from the Internet based on model information of available MFPs. Furthermore, the portable terminal 2 may directly send data to each of the MFPs 11 to 14.

(7) The above embodiment has been described, but not by way of limitation, that the management server 3 for relaying data is provided between the portable terminal 2 and the MFPs 11 to 14, and the management server 3 may not be provided. For example, the portable terminal 2 may directly communicate with each of the MFPs 11 to 14, so that the portable terminal 2 can monitor whether the MFPs are available, acquire applicable execution conditions from the MFPs selected as a preregistration destination, and send, to the selected MFPs, information on set job execution conditions (the first information x1) and information on a setting screen configuration (the second information x2).

Also, functions of the management server 3 (monitoring connection between MFPs and a LAN, and relaying data) may be allocated to any of the MFPs 11 to 14. For example, in the case where functions of the management server 3 are allocated to the MFP 11, the portable terminal 2 acquires, from the MFP 11, information on available MFPs and execution conditions which can be set to MFPs selected as a preregistration destination, and sends, to the selected MFPs via the MFP 11, information on set job execution conditions (the first information x1) and information on a setting screen configuration (the second information x2).

(8) The above embodiment has been described, but not by way of limitation, that after job preregistration destinations have been selected, the portable terminal 2 acquires information on execution conditions which can be set to selected MFPs. For example, the portable terminal 2 may acquire, in advance, information on execution conditions which can be set to all of available MFPs, and store the information in the data storage unit 204. In this case, a display speed of the execution condition setting screen 222 can be improved in comparison with the case where the information is acquired after preregistration destinations have been selected.

(9) The second embodiment has been described, but not by way of limitation, that in the case where multiple MFPs are selected as job preregistration destinations, and the registered job is executed by one of the MFPs, a notification that the registered job has been executed is sent to the other preregistration destinations. For example, the notification that a registered job has been executed may be sent to all of available MFPs, not just to preregistration destinations. MFPs which have not preregistered a job can ignore the notification. As a result, the management server 3 does not need to distinguish MFPs which have preregistered a job and need the above notification, from MFPs which have not preregistered a job and do not need the notification. Therefore, data received from the portable terminal 2 and sent to each of the MFPs 11 to 14 does not need to be stored and managed in the above transmitted and received data management table T4 (not illustrated in the figure), and a load of the management server 3 can be reduced.

(10) The second embodiment has been described, not by way of limitation, that a notification that a registered job has been executed (including a registration number) is sent to the management server 3 (step S213), after the execution of the registered job (step S212) in "job preregistration receiving and execution processing" (see FIG. 18) of an MFP. For example, a notification of execution of a registered job may be sent before the execution of the registered job, or sent during the execution.

As the above embodiment, if a notification of execution of a registered job is sent after the registered job has been executed, there is an advantage that a user can execute the job again by another MFP, which has preregistered the job, in the case where an MFP has any trouble (for example running out of toner) during execution of the preregistered job.

(11) In the above embodiment, although not described specifically, when a user confirms a registered job from the registration list 431a of the operation panel 40, user authentication may be required.

For user authentication, for example, a user ID is input from the operation panel 40, or an IC card can be used. By correlating this user authentication information to an apparatus name (or a model code) of the portable terminal 2 which a user usually uses, a job registered from the portable terminal 2 can be displayed on the registration list 431a on the operation panel 40 after user authentication. As a result, a user can immediately find a job which the user has preregistered, preventing another user from executing the registered job.

(12) In the above embodiment, examples of a job, for which execution conditions are set from the portable terminal 2 and which is instructed for execution from an operation panel of an MFP, include, but are not limited to, a copy, a scan, and a facsimile, which are executed after a document has been set. For example, the present invention is applicable in the case of so-called pull printing in which a printing job is executed by being read from an operation panel of an MFP after the printing job is issued from the portable terminal 2, so that a document may not be read by other users when printing a highly confidential document. As a result, operability at confirming or changing a set content of a printing job on the operation panel can be improved.

(13) The above embodiment has been described, but not by way of limitation, that icons of execution conditions are arranged in a single horizontal line on the execution condition setting screen 222 of the portable terminal 2 and the registered job setting display screen 432 of the operation panel 40, and the icons may be arranged in a single vertical line or in matrix.

(14) The above embodiment has been described, but not by way of limitation, that a set content of a registered job in an MFP is displayed on the registered job setting display screen 432, which corresponds to a screen layout of the execution condition setting screen 222 of the portable terminal 2.

Figure 22:
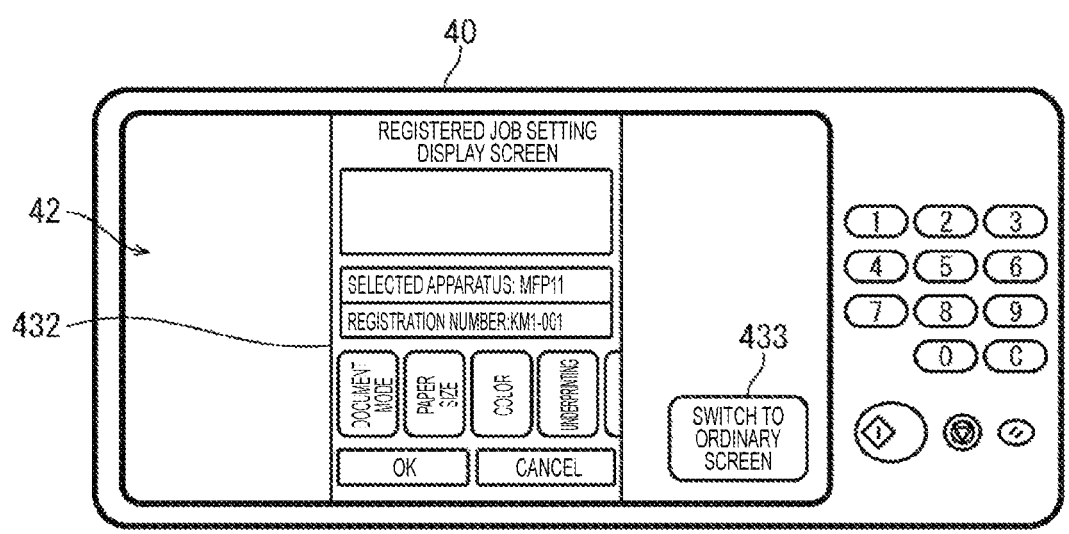
FIG. 22 is a view for describing an example of an operation panel of the MFP according to the variation.

For example, as illustrated in FIG. 22, a switch button 433 for switching to an ordinary screen is displayed on the operation panel 40 (a liquid crystal display unit 42) of an MFP. When a user taps the switch button 433, the screen may be switched to a screen (a normal screen) for normally setting job execution conditions of, for example, a copy, a scan, and a facsimile from the operation panel 40, and a set content of a registered job may be displayed on the normal screen.

(15) The above embodiment has been described, but not by way of limitation, that first an MFP is selected as a preregistration destination on the MFP selection screen 221 of the portable terminal 2, and then the execution condition setting screen 222 is generated based on job execution conditions which can be set to the selected MFP, and setting input of job execution conditions is received. For example, a user does not directly select an MFP to preregister a job, and the MFP is limited to an MFP fulfilling all of set execution conditions in the process of setting the job execution conditions, and an MFP remaining at a time when setting is completed is determined to be selected by a user.

More specifically, for example, the control unit 200 of the portable terminal 2 skips displaying the MFP selection screen 221 of FIG. 3B and displays the execution condition setting screen 222 illustrated in FIG. 3C, when image processing (a copy, a scan, and a facsimile) is selected on the preregistration menu screen 220 of FIG. 3A. Herein, in the control unit 200, an initial value of a selected MFP on the above skipped MFP selection screen 221 is applied to all of available MFPs. The control unit 200 generates and displays settable icons, not dummy icons, for execution conditions which can be set to at least one of the available MFPs, in the icon region R24 on the execution condition setting screen 222. Setting input by a user is accepted on the thus generated execution condition setting screen 222, and every time execution conditions are set, the control unit 200 limits selected MFPs to MFPs fulfilling all of set execution conditions (the control unit 200 functions as an apparatus limiting unit). In the control unit 200, an MFP remaining when a user completes setting input is determined to be selected by the user.

In this case, an apparatus name displayed on the selected apparatus display region R22 in the execution condition setting screen 222 is preferably updated every time an execution condition is set. In the above description, the MFP selection screen 221 is skipped after the preregistration menu screen 220 of FIG. 3A, and the execution condition setting screen 222 of FIG. 3C is displayed. However, the MFP selection screen 221 may be displayed without being skipped in a state that all of available MFPs are selected. In this case, a user taps an OK button B1 if the user accepts that all of the MFPs are selected, and may go to the execution condition setting screen 222. However, if an MFP which is obviously not selected is included, the user may tap an icon of the MFP to clear the selection.

(16) In the above embodiment, although an image processing apparatus has been described by using a color multifunction printer and a black and white multifunction printer, an applicable range of the present invention is not limited to the above, and the present invention can be applied to a color scanner, a black and white scanner, and a facsimile apparatus.

(17) In the above embodiment, although a portable information terminal has been described by using a tablet type personal computer, an applicable range of the present invention is not limited to the above, and the present invention can be applied to a multifunction mobile phone such as a smartphone and a PDA.

The above embodiments and each variation may be combined whenever possible. Also, contents of the above embodiments and variations may be combined whenever possible.

An image processing system according to an embodiment of the present invention is practical as a technique for improving operability of an operation panel which displays, on an image processing apparatus side, execution conditions of a job preregistered to the image processing apparatus from a small sized portable information terminal such as a smartphone.

Although the present invention has been described and illustrated in detail, it is clearly understood that the same is by way of illustrated and example only and is not to be taken by way of limitation, the scope of the present invention being interpreted by terms of the appended claims.

What is claimed is:
1. An image processing system comprising:
one or more image processing apparatuses connected to a network; and
a portable information terminal having a function to preregister an image processing job to at least one of the image processing apparatuses,
wherein the portable information terminal comprises:
a processor configured to:
receive, based on a user operation, a selection of at least one of the image processing apparatuses to preregister a job;
display a condition setting screen for setting an execution condition of image processing and receive setting input by a user, wherein the condition setting screen has a layout configuration determined in advance with respect to each of predetermined multiple screen resolutions; and
a sending unit configured to send, to the image processing apparatus having been selected, first information on the execution condition of image processing, which has been received from the condition setting screen, and second information including a configuration of the condition setting screen itself as displayed on a display of the portable information terminal, and
each of the one or more image processing apparatuses comprises:
a processor configured to:
preregister an image processing job upon receiving the first information sent from the portable information terminal; and
generate a job setting display screen showing a set content of an execution condition of the preregistered image processing job so as to correspond to a configuration of the condition setting screen of the portable information terminal based on the second information, and display the job setting display screen on an operation panel which receives operation input from a user.

2. The image processing system according to claim 1, wherein two or more image processing apparatuses are connected to the network, the processor of the portable information terminal is configured to accept multiple selections of multiple image processing apparatuses, and in the case where multiple image processing apparatuses are selected, the sending unit sends the first information and the second information to the selected multiple image processing apparatuses.

3. The image processing system according to claim 2, wherein each of the image processing apparatuses comprises:

a job execution unit configured to execute the preregistered image processing job;

a notification unit configured to notify at least another image processing apparatus, selected, of execution of a job when the job is executed by the job execution unit; and a deleting unit configured to delete the corresponding preregistered image processing job when receiving the notification from the other image processing apparatus.

4. The image processing system according to claim 1, wherein, in the portable information terminal, the processor is further configured to:

acquire information on an available at least one of the image processing apparatuses; and generate an apparatus selection screen capable of selecting one or multiple image processing apparatuses based on the acquired information on an available image processing apparatus, receive the image processing apparatus selected in the apparatus selection screen as a preregistration destination of a job, acquire an execution condition of image processing settable to one or multiple image processing apparatuses selected as a preregistration destination; and generate the condition setting screen based on the acquired execution condition.

5. The image processing system according to claim 4, wherein, in the case where multiple image processing apparatuses are selected on the apparatus selection screen, the processor of the portable information terminal:

determines whether the acquired execution condition is common among the image processing apparatuses, and preferentially arranges an execution condition common among the image processing apparatuses on the condition setting screen.

6. The image processing system according to claim 5, wherein, on the condition setting screen, an execution condition common among the image processing apparatuses is displayed with a first icon, and a non-common execution condition is displayed with a second icon different from the first icon in at least one of a color, a shape, and a size.

7. The image processing system according to claim 6, wherein the second icon is a dummy icon which is just displayed and not selectable.

8. The image processing system according to claim 6, wherein an icon display region for displaying the first icon and the second icon on the condition setting screen is scrollable, and the second icon is not displayed in an initial state of the condition setting screen and displayed by scrolling the icon display region.

9. The image processing system according to claim 1, wherein the second information includes a screen resolution of an input panel which displays the condition setting screen of the portable information terminal and layout information of the condition setting screen.

10. The image processing system according to claim 1, wherein the portable information terminal comprises a first storage unit configured to store layout information of the condition setting screen and a layout number thereof corresponding to a screen resolution of an input panel of the portable information terminal, the processor of the portable information terminal generates a condition setting screen based on the layout information stored in the first storage unit, the second information includes the layout number, each of the image processing apparatuses comprises a second storage unit which stores the layout information and the layout number corresponding to predetermined multiple screen resolutions of the condition setting screen, and the processor of the image processing apparatus acquires the layout information stored in the second storage unit from the layout number included in the second information, and generates the job setting display screen based on the acquired layout information.

11. The image processing system according to claim 1, wherein, in the case where there are multiple image processing jobs which have been preregistered by the same portable information terminal and are in a waiting state, in each of the image processing apparatuses, the processor arranges execution conditions of the image processing jobs in a waiting state in a predetermined sequence such that display sequences of the execution conditions are equalized among the image processing jobs when the execution conditions are displayed on the job setting display screen.

12. The image processing system according to claim 11, wherein the predetermined sequence is determined based on the second information, which is sent from the portable information terminal when an execution condition of an image processing job most recently registered among the image processing jobs in a waiting state is set.

13. The image processing system according to claim 1, wherein each of the image processing apparatuses comprises:

a job selection unit configured to select, from the operation panel, an image processing job preregistered by the processor;

an execution instruction receiving unit configured to receive an execution instruction with respect to the image processing job by the job selection unit; and a display instruction receiving unit configured to receive a display instruction of a set content on the job setting display screen.

14. The image processing system according to claim 1, wherein each of the image processing apparatuses comprises a setting change receiving unit configured to receive a setting change of an execution condition of a preregistered image processing job through the job setting display screen displayed by the processor.

15. The image processing system according to claim 1, wherein a server for relaying communication between the portable information terminal and the one or more image processing apparatuses is further connected to the network, the sending unit of the portable information terminal is configured to send, to the server, third information on an image processing apparatus of a preregistration destination together with the first information and the second information, and the server comprises a delivery unit configured to deliver the first information and the second information to the image processing apparatus of a preregistration destination based on the third information.

16. The image processing system according to claim 1, wherein the second information which the portable information terminal sends includes a layout number of the condition setting screen corresponding to a screen resolution of an input panel of the portable information terminal, each of the image processing apparatuses comprise a storage unit which stores the layout information and the layout number corresponding to predetermined multiple screen resolutions of the condition setting screen, and the display control unit acquires the layout information stored in the second storage unit from the layout number included in the second information, and generates the job setting display screen based on the acquired layout information.

17. The image processing system according to claim 1, wherein the second information which the portable information terminal sends includes a resolution of the portable information terminal and layout information of the condition setting screen, and each of the image processing apparatuses generates the job setting display screen based on the second information.

18. An image processing apparatus having a function to preregister an image processing job upon receiving information on an execution condition received through a condition setting screen for setting an execution condition of image processing in a portable information terminal, the image processing apparatus comprising:

a receiving unit configured to receive screen configuration information including a configuration of the condition setting screen itself as displayed on a display of the portable information terminal sent from the portable information terminal; and a processor configured to generate a job setting display screen showing a set content of an execution condition of a preregistered image processing job so as to correspond to a configuration of the condition setting screen of the portable information terminal based on the screen configuration information and display the job setting display screen on an operation panel which receives operation input from a user;

wherein the condition setting screen has a layout configuration determined in advance with respect to each of predetermined multiple screen resolutions.

19. A portable information terminal communicatively connected, via a network, to one or more image processing apparatuses which preregister an image processing job based on information on an execution condition of image processing sent via the network, generate a job setting display screen showing a setting content of an execution condition of the preregistered image processing job so as to correspond to a configuration of the condition setting screen of the portable information terminal based on screen configuration information sent via the network, and display the job setting display screen on an operation panel, the portable information terminal comprising:

a display; and a processor configured to:

receive, based on a user operation, a selection of an image processing apparatus to preregister a job;

display a condition setting screen for setting an execution condition of image processing and receive setting input by a user, wherein the condition setting screen has a layout configuration determined in advance with respect to each of predetermined multiple screen resolutions; and a sending unit configured to send, to the image processing apparatus selected by the user, information on an execution condition of image processing received on the condition setting screen and screen configuration information including a configuration of the condition setting screen itself as displayed on the display of the portable information terminal.

20. A non-transitory recording medium storing a computer readable program to be executed in a computer of a portable information terminal, which is communicatively connected, via a network, to one or more image processing apparatuses which preregister an image processing job based on information on an execution condition of image processing sent via the network, generate a job setting display screen showing a setting content of an execution condition of the preregistered image processing job so as to correspond to a configuration of the condition setting screen of the portable information terminal based on screen configuration information sent via the network, and display the job setting display screen on an operation panel, wherein the program causes the computer to execute:

(a) a step of receiving, from a user, a selection of an image processing apparatus to preregister a job;

(b) a step of displaying a condition setting screen for setting an execution condition of image processing on an input panel and receiving setting input by a user, wherein the condition setting screen has a layout configuration determined in advance with respect to each of predetermined multiple screen resolutions; and (c) a step of sending, to the image processing apparatus selected by the user, first information on an execution condition of image processing received on the condition setting screen and second information including a configuration of the condition setting screen itself as displayed on a display of the portable information terminal.

21. The non-transitory recording medium storing a computer readable program according to claim 20, wherein the program is capable of receiving multiple selections of an image processing apparatus in the step (a), and in the case where multiple image processing apparatuses are selected, the program sends the first information and the second information to the selected multiple image processing apparatuses in the step (c).

22. The non-transitory recording medium storing a computer readable program according to claim 20, the program causing the computer to further execute:

(d) a step of acquiring, from multiple image processing apparatuses, information on the image processing apparatuses; and (e) a step of generating a apparatus selection screen capable of selecting one or multiple image processing apparatuses based on the acquired information on the image processing apparatuses.

23. The non-transitory recording medium storing a computer readable program according to claim 20, wherein the portable information terminal comprises a memory which has stored, in advance, an execution condition of image processing settable to multiple image processing apparatuses, and the program causes the computer to further execute (f) a step of generating the condition setting screen based on the stored execution condition.

24. The non-transitory recording medium storing a computer readable program according to claim 23, wherein an execution condition, which is common among multiple image processing apparatuses, is preferentially arranged on the condition setting screen in the step (f).

25. The non-transitory recording medium storing a computer readable program according to claim 20, wherein the second information includes a screen resolution of an input panel for displaying the condition setting screen of the portable information terminal and layout information of the condition setting screen.

26. The non-transitory recording medium storing a computer readable program according to claim 20, the program causing the computer to further execute:

(g) a step of receiving information on job execution from any of the multiple image processing apparatuses which have preregistered a job; and (h) a step of sending the information on job execution to an image processing apparatus other than the image processing apparatus which has sent the information on job execution among the multiple image processing apparatuses which have preregistered a job.

* * * * *